(12) United States Patent
He et al.

(10) Patent No.: US 9,519,142 B2
(45) Date of Patent: Dec. 13, 2016

(54) ELECTRONIC DEVICE AND DISPLAY METHOD

(71) Applicants: Beijing Lenovo Software, Ltd., Haidian District, Beijing (CN); Lenovo (Beijing) Co., Ltd., Haidian District, Beijing (CN)

(72) Inventors: Zhiqiang He, Beijing (CN); Junfeng Liu, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 274 days.

(21) Appl. No.: 14/230,068

(22) Filed: Mar. 31, 2014

(65) Prior Publication Data
US 2015/0049120 A1    Feb. 19, 2015

(30) Foreign Application Priority Data

Aug. 13, 2013  (CN) .......................... 2013 1 0351409
Jan. 2, 2014   (CN) .......................... 2014 1 0001165

(51) Int. Cl.
G09G 5/00    (2006.01)
G02B 27/01   (2006.01)
H04N 5/66    (2006.01)

(52) U.S. Cl.
CPC ......... *G02B 27/01* (2013.01); *G02B 2027/014* (2013.01); *G02B 2027/0138* (2013.01); *G02B 2027/0187* (2013.01); *H04N 5/66* (2013.01)

(58) Field of Classification Search
None
See application file for complete search history.

(56) References Cited

U.S. PATENT DOCUMENTS

| | | |
|---|---|---|
| 5,991,084 A | 11/1999 | Hildebrand |
| 6,158,884 A | 12/2000 | Lebby |

(Continued)

FOREIGN PATENT DOCUMENTS

| | | |
|---|---|---|
| CN | 1324030 | 11/2001 |
| CN | 2466691 | 12/2001 |

(Continued)

OTHER PUBLICATIONS

U.S. Appl. No. 14/230,105 Non-Final Rejection dated Aug. 14, 2015 (23 pages).
First Office Action dated Apr. 6, 2016 out of corresponding Chinese priority Application No. 201310351409.3 (10 pages including English translation).
Final Rejection dated Feb. 24, 2016 out of U.S. Appl. No. 14/230,105 (6 pages).

(Continued)

*Primary Examiner* — Peter Hoang
(74) *Attorney, Agent, or Firm* — Brinks Gilson & Lione; G. Peter Nichols

(57) ABSTRACT

An electronic device and a display method include a main body with a processing unit that generates a first image and performs display control; a fixing apparatus connected with the main body apparatus, which has at least a first fixed state in which the fixing apparatus can be at least a part of an annular space or an approximate annular space meeting a first predetermined condition, the annular space or the approximate annular space being capable of surrounding an outer side of a cylinder meeting a second predetermined condition; and a display unit arranged on the main body apparatus or the fixing apparatus, which outputs the first image; wherein the display unit comprises a first display component outing a first image and a first optical component forming a magnified virtual image corresponding to the first image.

18 Claims, 18 Drawing Sheets

(56) References Cited

U.S. PATENT DOCUMENTS

| | | |
|---|---|---|
| 6,619,835 B2 | 9/2003 | Kita |
| 7,699,473 B2 | 4/2010 | Mukawa |
| 8,279,716 B1 | 10/2012 | Gossweiler |
| 8,379,488 B1 | 2/2013 | Gossweiler |
| RE45,148 E | 9/2014 | Mukawa |
| 8,902,714 B2 | 12/2014 | Gossweiler |
| 2001/0043514 A1 | 11/2001 | Kita |
| 2002/0135615 A1 | 9/2002 | Lang |
| 2003/0210467 A1 | 11/2003 | Song |
| 2006/0146013 A1 | 7/2006 | Arneson |
| 2007/0064310 A1 | 3/2007 | Mukawa |
| 2008/0151379 A1 | 6/2008 | Amitai |
| 2011/0141114 A1* | 6/2011 | Chen ............... G06F 3/012 345/428 |
| 2011/0205851 A1 | 8/2011 | Harris |
| 2012/0274508 A1 | 11/2012 | Brown |
| 2013/0163390 A1 | 6/2013 | Gossweiler |
| 2013/0222271 A1 | 8/2013 | Alberth |
| 2013/0342672 A1* | 12/2013 | Gray ............... G06F 3/013 348/78 |
| 2014/0107493 A1 | 4/2014 | Yuen |
| 2014/0146248 A1 | 5/2014 | Wang |
| 2015/0049000 A1 | 2/2015 | He |
| 2015/0049066 A1 | 2/2015 | He |
| 2015/0049120 A1 | 2/2015 | He |

FOREIGN PATENT DOCUMENTS

| | | |
|---|---|---|
| CN | 1771454 | 5/2006 |
| CN | 101091377 | 12/2007 |
| CN | 202486428 U | 10/2012 |
| CN | 102881229 | 1/2013 |
| CN | 202735594 U | 2/2013 |
| CN | 203101853 U | 7/2013 |
| CN | 103309040 | 9/2013 |
| CN | 203433196 U | 2/2014 |
| JP | 2001-311908 | 11/2001 |

OTHER PUBLICATIONS

Final Rejection dated Feb. 24, 2016 from U.S. Appl. No. 14/230,105 (6 pages).

First Office Action dated May 23, 2016 out of Chinese priority Application No. 201310421847.2 (21 pages including English translation).

Non-Final Rejection dated Jul. 26, 2016 out of U.S. Appl. No. 14/230,629 (39 pages).

First Office Action dated Sep. 2, 2016 out of related Chinese Patent Application No. 201310717724.3 (29 pages including English translation).

\* cited by examiner the optical system is of a plate shape the optical system is of a shape with curvature

ELECTRONIC DEVICE AND DISPLAY METHOD

BACKGROUND

This application claims priority to Chinese patent application No. 201310351409. 3 filed on Aug. 13, 2013; and Chinese patent application No. 201410001165. 0 filed on Jan. 2, 2014, the entire contents of which are incorporated herein by reference.

The present disclosure relates to the field of electronic device, and more particularly to an electronic device with a built-in near-to-eye display system and a display method thereof.

Presently, the wearable electronic devices such as the smart watch is only provided with a conventional display such as a liquid crystal display (LCD), an organic electroluminescence display or an organic light emitting diode (OLED) display etc., in general. Limited by the size of the wearable electronic device such as the smart watch itself, the display area of the provided conventional display is generally very small, and only limited information can be displayed.

Therefore, it is desirable to provide an electronic device and a display method thereof, which is capable of not being limited by the size of the wearable electronic device such as the smart watch itself, and providing an image or video display with a larger size and a higher definition, thereby improving the related user experience.

Moreover, currently, the conventional display device such as the liquid crystal display (LCD), the organic electroluminescence display, or the organic light emitting diode (OLED) display etc. generally has two states, i.e., a displaying state and a non-displaying state. In the displaying state, the user views the image displayed on the display device. The maximum size of the image viewable by the user is the maximum size of the display region of the display device. However, with the trend of the emphasis on the user experience in the smart device, the traditional display device cannot meet the requirement increasingly. For example, in the smart device equipped with the traditional display, such as the smart phone, the tablet, or the smart watch etc., the display area of the display is very small generally, and only limited information can be displayed. When the user expects to view an image having more information or with a larger size, the traditional display cannot meet the requirement.

SUMMARY

According to an embodiment of the present disclosure, an electronic device is provided, comprising: a main body apparatus comprising a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which can at least receive light corresponding to the first image emitted from the first display component, and change the light path of the light corresponding to the first image to form a magnified virtual image corresponding to the first image.

Also, in the electronic device according to the embodiment of the present disclosure, at least a part of the first optical component is a component the transmittance of which meets a predetermined condition in the outward direction of the annular space or the approximate annular space.

Also, in the electronic device according to the embodiment of the present disclosure, the transmittance of the electronic device meets a predetermined condition in the outward direction of the annular space or the approximate annular space corresponding to at least a part of the first optical component.

Also, the electronic device according to the embodiment of the present disclosure further comprises a second display unit the type of which is different from that of the first display unit, wherein one of the first display unit and the second display unit is arranged on the main body apparatus, the other of which is arranged on the fixing apparatus, and the display direction of the second display unit is the outward direction of the annular space or the approximate annular space.

Also, in the electronic device according to the embodiment of the present disclosure, the first display unit is arranged on the main body apparatus, and the second display unit is arranged on the fixing apparatus; or the second display unit is arranged on the main body apparatus and the first display unit is arranged on the fixing apparatus.

Also, the electronic device according to the embodiment of the present disclosure further comprises a sensor unit arranged on the main body apparatus or the fixing apparatus, which generates a first control signal when sensing that the first predetermined condition is met, the processing unit controlling the on/off of the first display unit according to the first control signal.

Also, in the electronic device according to the embodiment of the present disclosure, the sensor unit is an acceleration sensor, the acceleration component value in the gravity direction of the first control signal is larger than or equal to a predetermined value, and the processing unit controls the on/off of the first display unit according to the first control signal.

Also, the electronic device according to the embodiment of the present disclosure further comprises an image capturing unit arranged on the main body apparatus or the fixing apparatus, and an image capturing direction of the image capturing unit is opposite to an image output direction of the first display unit in the radial direction of the annular space or the approximate annular space.

Also, in the electronic device according to the embodiment of the present disclosure, the image capturing unit captures an interaction action of the user to generate a first image capturing signal, and the processing unit converts the first image capturing signal into a second control signal to control the display of the second image.

Also, in the electronic device according to the embodiment of the present disclosure, the image capturing unit captures a first sub image in the image capturing direction, and the processing unit generates a second sub image, and superimposes the first sub image with the second sub image to generate the first image.

Also, the electronic device according to the embodiment of the present disclosure further comprises a third display unit arranged on the main body apparatus or the fixing apparatus together with the first display unit, which outputs a third image, wherein the second display unit comprise a second display component for displaying the third image, and a second optical component for receiving light corresponding to the third image emitted from the second display component and changing the light path of the light corresponding to the third image to form a magnified virtual image corresponding to the third image.

According to another embodiment of the present disclosure, a display method applied to an electronic device is provided, the electronic device comprising: a main body apparatus comprising a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image; the display method comprising: generating or acquiring an image signal for display; and performing display based on the image signal.

According to another embodiment, a display device is provided, comprising: a display apparatus capable of displaying image with two display modes; and a control apparatus coupled with the display apparatus, which controls the display apparatus to switch between a first display mode and a second display mode when a predetermined condition is met; the display image viewed by the user is a real image in the first display mode, and the display image viewed by the user is a virtual image in the second display mode.

The display region of the display apparatus in the first display mode is a first region, the display region of the display apparatus in the second display mode is a second region, and the first region and the second region are at least partly overlapped.

The display device further comprises a distance detection apparatus arranged near the display apparatus, the detection direction of which is towards a viewable space of the display apparatus, which detects a distance parameter between an object and the display apparatus; wherein the predetermined condition is that the distance between the object and the display unit is smaller than a first threshold.

The predetermined condition further comprises that the distance between the object and the display apparatus is larger than a second threshold.

The display device further comprises an identifying apparatus arranged near the display apparatus, which identifies whether the user's eyeball is watching the display apparatus in the viewable space faced by the display apparatus; wherein the predetermined condition further comprises that the user's eyeball is watching the display apparatus.

The identifying apparatus further comprises an image capturing unit for capturing image of an object; an image analyzing unit for analyzing the image to determine whether the user's eyeball is watching the display apparatus.

The display apparatus comprises a display unit and an optical unit, the optical unit covers the display unit and meets a predetermined transmittance, so that the user can view the image displayed on the display unit via the optical unit; and the optical unit has two optical modes, the optical unit is in a first optical mode in the first display mode, and is in a second optical mode in the second display mode.

The optical unit is constructed of a shape changeable cavity and filled-in liquid; in the first display mode, the optical unit is in the first optical mode, the shape changeable cavity does not change its shape and maintains a first shape so that the user views a real image of the same size with the image displayed on the display unit via the shape changeable cavity; in the second display mode, the optical unit is in the second optical mode, the shape changeable cavity changes its shape to a second shape, and the user views a magnified virtual image of the display image on the display unit via the shape changeable cavity.

The user views the magnified virtual image via an optical attachment in the second display mode.

The location of the optical attachment with respect to the display apparatus is different in the first display mode and the second display mode, and the optical attachment covers at least a part of region of the display apparatus in the second display mode.

The display apparatus comprises a first resolution display part in the first region, which is capable of displaying image with a first resolution; and a second resolution display part in the second region, which is capable of displaying image with a second resolution higher than the first resolution; in the first display mode, both the first resolution display part and the second resolution display part display image with the first resolution; in the second display mode, only the second resolution display part displays image with the second resolution; the locations of the first region and the second region are fixed; and the user views a virtual image of the image with the second resolution in the second display mode via the optical attachment.

In the first display mode, the image is displayed in the first region with a first resolution, and displayed in the second region with a second resolution higher than the first resolution; the user views a virtual image of the image with the second resolution in the second display mode via the optical attachment, wherein the entire display region of the display apparatus can display with the second resolution.

The control apparatus determines the location of the second region based on the acquired parameter.

The display apparatus displays a first image in the first display mode, and displays a second image in the second display mode; and the control apparatus generates the second image based on the first image, so that the content of the first image and the second image is correlated but different, and the information amount of the second image is larger than that of the first image.

The display device further comprises a fixing apparatus for maintaining a relative location relationship between the display device and at least a part of body of the user when the user wears the display device.

The fixing apparatus has at least a fixed state in which the fixing apparatus can be at least a part of an annular space or an approximate annular space meeting a first predetermined condition capable of surrounding the outer side of a cylinder meeting a second predetermined condition.

According to another embodiment of the present disclosure, a display switch method is provided, applied to an electronic device having a display apparatus capable of display image with two display modes, the display switch method comprising: controlling the display apparatus to switch between a first display mode and a second display mode when a predetermined condition is met; the display image viewed by the user is a real image in the first display mode, and the display image viewed by the user is a virtual image in the second display mode.

The display switch method further comprises detecting a distance parameter between an object and the display unit; wherein the predetermined condition is that the distance between the object and the display apparatus is smaller than a first threshold.

The predetermined condition further comprises that the distance between the object and the display apparatus is larger than a second threshold.

The display switch method further comprises identifying whether the user's eyeball is watching the display apparatus in the viewable space faced by the display apparatus; wherein the predetermined condition further comprises that the user's eyeball is watching the display apparatus.

The step of identifying whether the user's eyeball is watching the display apparatus in the viewable space faced by the display apparatus further comprises capturing image of an object; and analyzing the image to determine whether the user's eyeball is watching the display apparatus.

The image is displayed in a first region in the first display mode, and in a second region in the second display mode. The display switch method further comprises determining the location of the second region based on the acquired parameter.

The display apparatus displays a first image in the first display mode, and displays a second image in the second display mode; and the display switch method further comprises: generating the second image based on the first image, so that the content of the first image and the second image is correlated but different, and the information amount of the second image is larger than that of the first image.

The electronic device and the display method according to the embodiments of the present disclosure are not limited by the size of the wearable electronic device such as the smart watch itself, and the image or video display with a larger size and a higher definition is provided. Also, the power consumption of the electronic device is relatively low compared to the micro projector for displaying a large image, the electronic device is not limited by the usage scene and well usage privacy is also provided.

Also, the display device and display switch method according to the embodiment of the present disclosure can provide two different watching experiences to the user, for example, a switching between a large size display and a small size display, and a switching between a brief display and a detailed display as well. Optionally, the switching can be performed on the same display device, so that the size and cost of the device can be effectively controlled.

It should be noted that the above general description and the following detailed description are exemplary and are intended to provide a further description of the technology to be protected.

DETAILED DESCRIPTION

Hereinafter the embodiments of the disclosure will be described with reference to the accompany drawings.

(First Implementation)

First, the electronic device according to an embodiment of the present disclosure will be described with reference to FIGS. 1A-1C. The electronic device according to the embodiment of the present disclosure may be a wearable electronic device such as a smart watch. Of course, it will be easily understood by those skilled in the art that the electronic device according to the embodiment of the present disclosure is not limited thereto, but may be any electronic device with a display unit therein. For the convenience of description, it will be described taking the wearable electronic device such as the smart watch as an example.

Figure 1A:
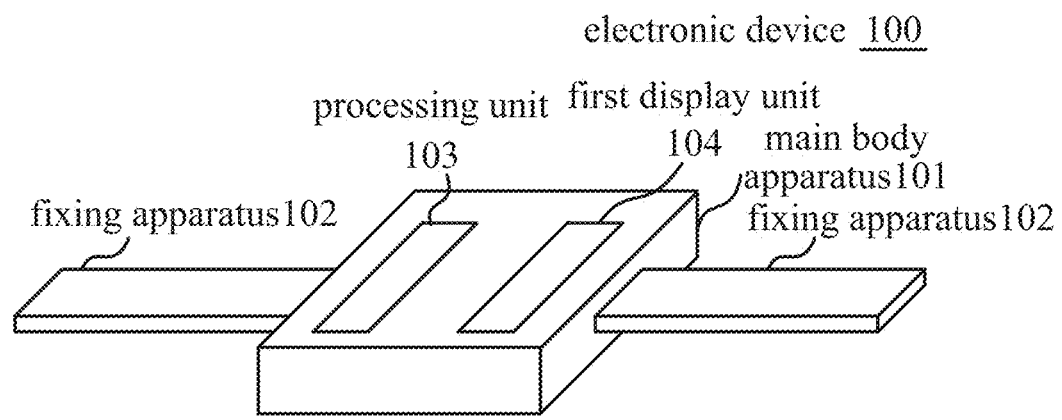
FIGS. 1A-1E are structural diagrams showing an electronic device according to a first embodiment of the present disclosure.

FIGS. 1A-1E are structural diagrams showing an electronic device according to a first embodiment of the present disclosure. As shown in FIG. 1A, the electronic device 100 according to the embodiment of the present disclosure includes a main body apparatus 101 and a fixing apparatus 102. The fixing apparatus 102 is connected with the main body apparatus 101. The fixing apparatus 102 has at least a fixed state in which the fixing apparatus 102 can be at least a part of an annular space or an approximate annular space meeting a first predetermined condition, the annular space or the approximate annular space being capable of surrounding an outer side of a cylinder meeting a second predetermined condition.

Figure 1B:
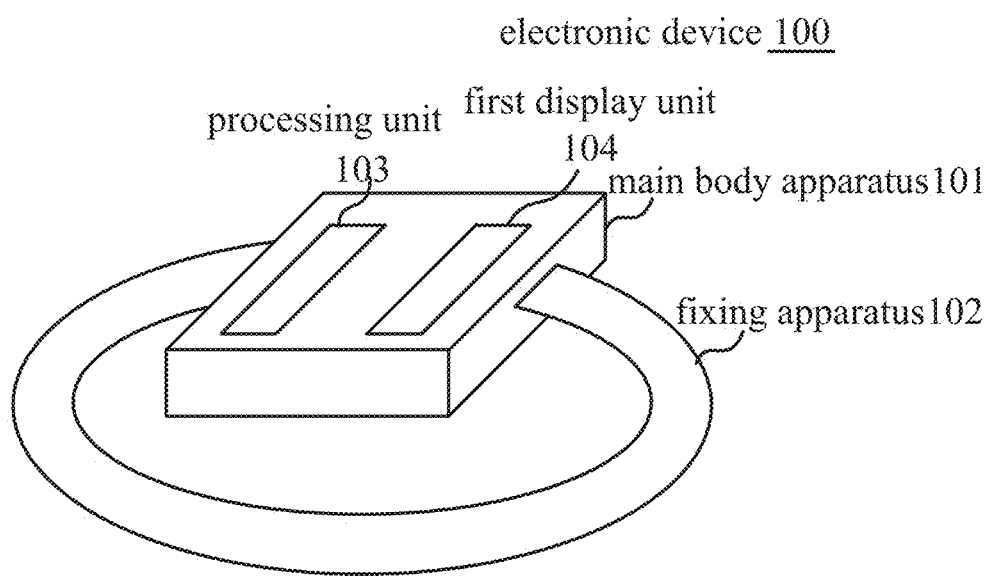
Figure 1C:
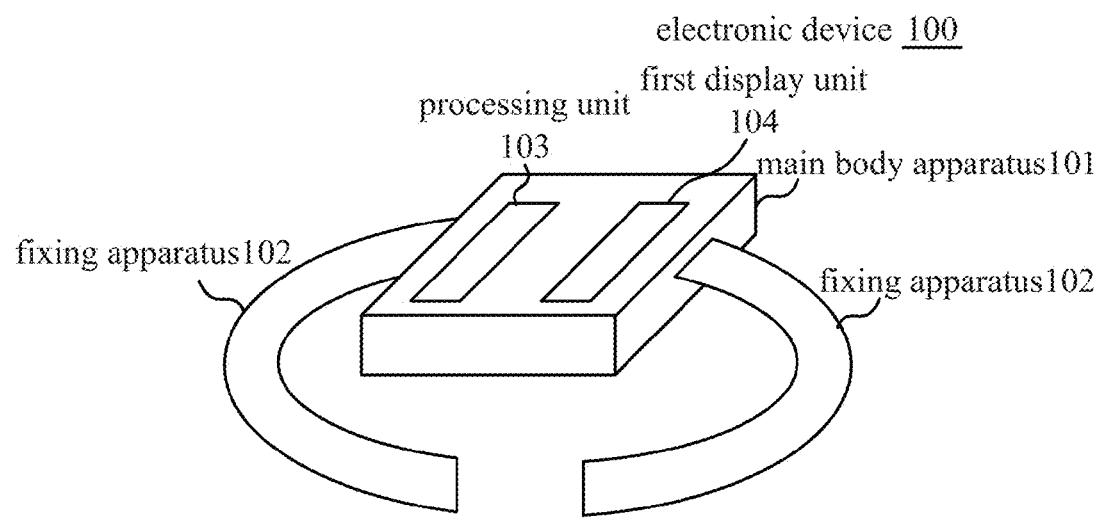

Particularly, FIGS. 1B and 1C are diagrams showing two fixed states in which the fixing apparatus 102 is connected with the main body apparatus 101. In the first fixed state as shown in FIG. 1B, the fixing apparatus 102 and the main body apparatus 101 form a closed-loop annular space. In the second fixed state as shown in FIG. 1C, the fixing apparatus 102 and the main body apparatus 101 form an approximate annular space with a small opening. In an embodiment of the present disclosure, the main body apparatus 101 is a dial section of the smart watch, and the fixing apparatus 102 is a watchband section of the smart watch. The annular space or the approximate annular space formed by the main body apparatus 101 and the fixing apparatus 102 can surround a wrist (as the cylinder) of a user of the smart watch, and the diameter of the annular space or the approximate annular space is larger than the diameter of the wrist of the user and smaller than the diameter of the first of the user.

Figure 1D:
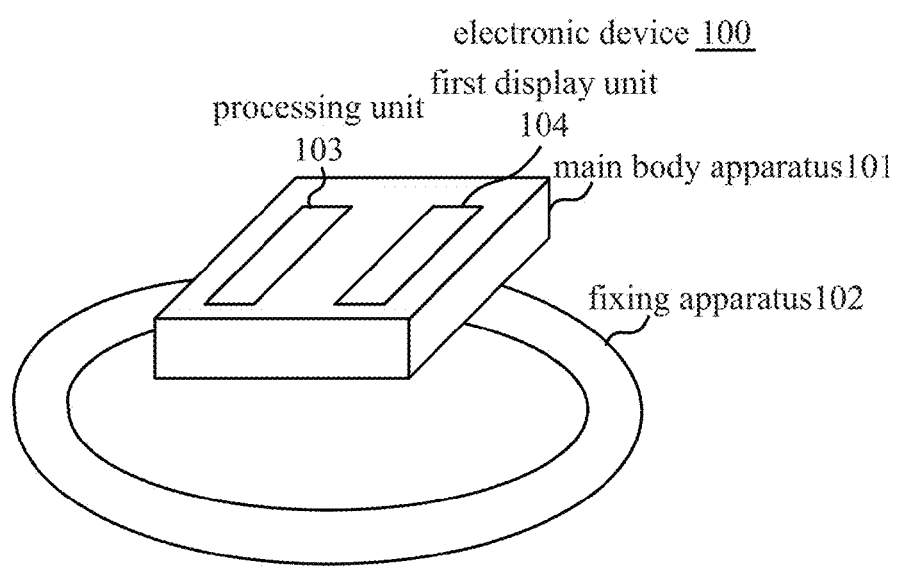
Figure 1E:
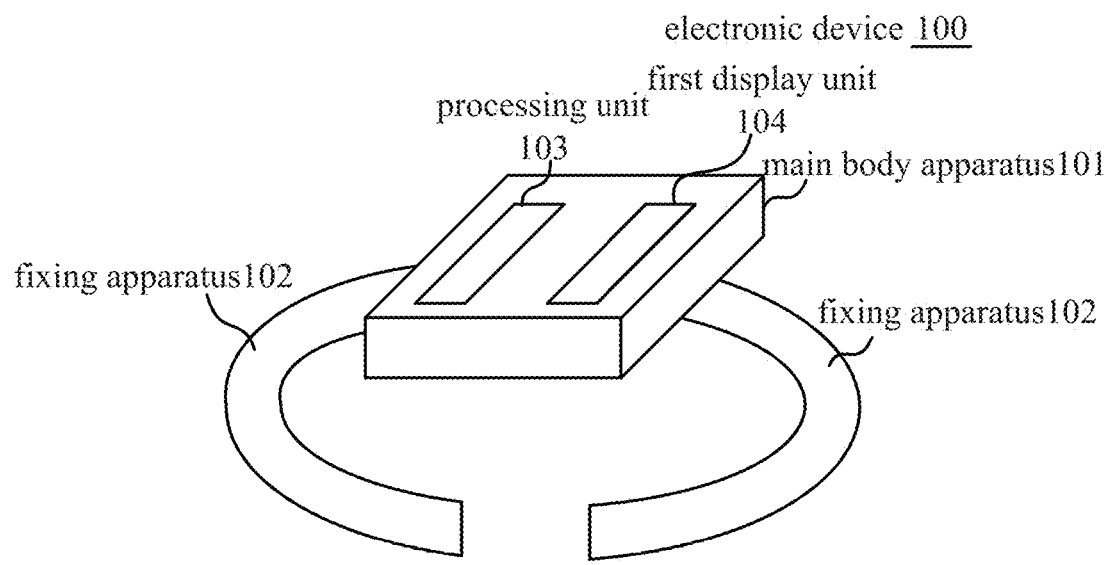

Also, of course, the annular space or the approximate annular space may be formed by the fixing apparatus 102 alone. As shown in FIGS. 1D and 1E, the main body apparatus 101 may be arranged on the fixing apparatus 102 (i.e., the main body apparatus 101 is attached to the fixing apparatus 102 by way of surface contact), so that only the fixing apparatus 102 itself forms the annular space (FIG. 1D) or the approximate annular space (FIG. 1E) surrounding the cylinder from the outside. The fixing apparatus 102 is arranged with a fixing structure such as an agraffe, a snap fastener or a slide fastener, etc. (not shown).

Further, as shown by FIGS. 1A-1E, the main body apparatus 101 is arranged with a processing unit 103 and a first display unit 104 thereon. The processing unit 103 is used to generate a first image and perform display control. In the electronic device 100 shown in FIGS. 1A-1E, the first display unit 104 is arranged on the main body apparatus 101. However, it will be easily understood by those skilled in the art that the present disclosure is not limited thereto. The first display unit 104 may also be arranged on the fixing apparatus 102. The principle and implementation of the first display unit 104 will be described in detail with reference to FIGS. 2A-2D and FIGS. 3A-3C.

Figure 2A:
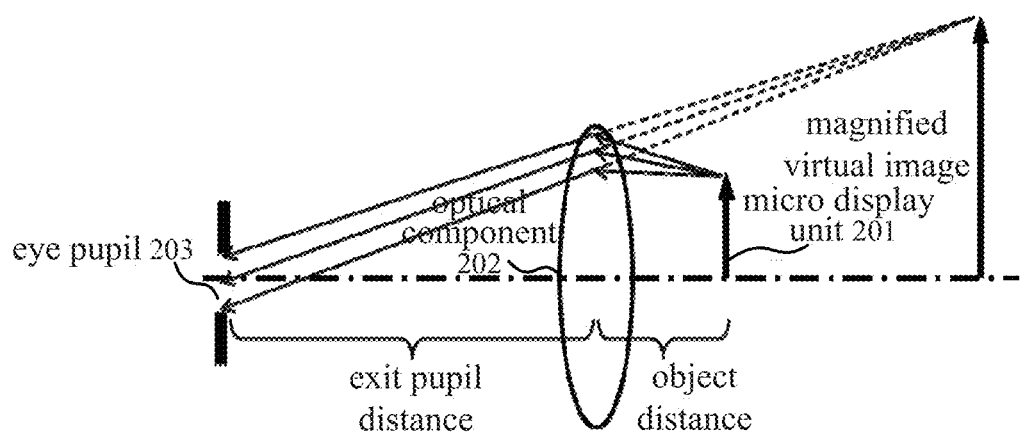
FIG. 2A is a principle diagram showing a near-to-eye display system applied in the electronic device according to the first embodiment of the present disclosure.

FIG. 2A is a principle diagram showing the near-to-eye optical display system applied in the electronic device according to the first embodiment of the present disclosure. In the electronic device according to the first embodiment of the present disclosure, the near-to-eye optical display system is used as the first display unit 104. As shown in FIG. 2, the light corresponding to the display image emitted by the micro display unit 201 in the near-to-eye optical display system is received via an optical component 202 such as a lens group, and the light path is changed. As a result, the light with the light path changed goes into the pupil 203 of the viewer and a magnified virtual image is formed.

Figure 2B:
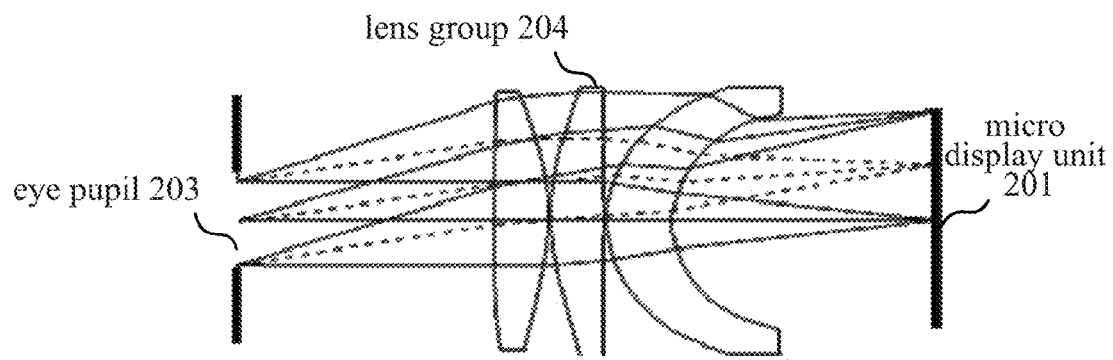
FIGS. 2B-2D are alternative embodiments of the principle diagram showing an alternative near-to-eye display system applied in the electronic device according to the first embodiment of the present disclosure.
Figure 2C:
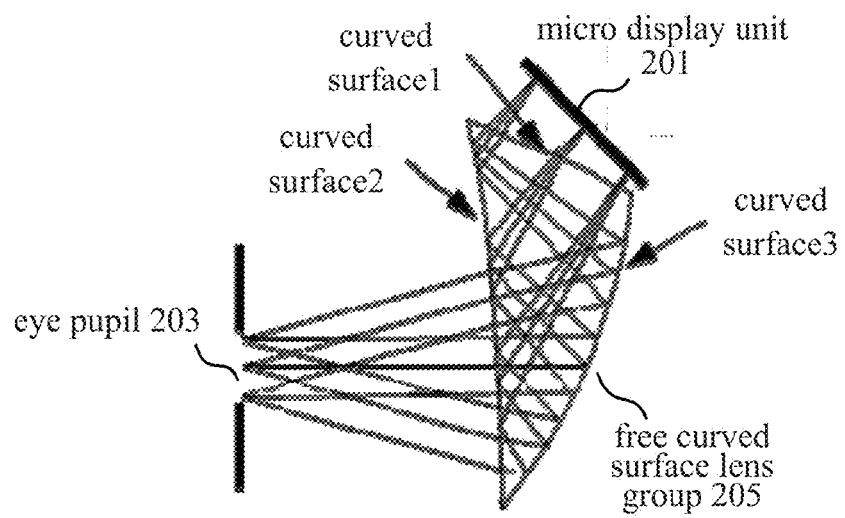
Figure 2D:
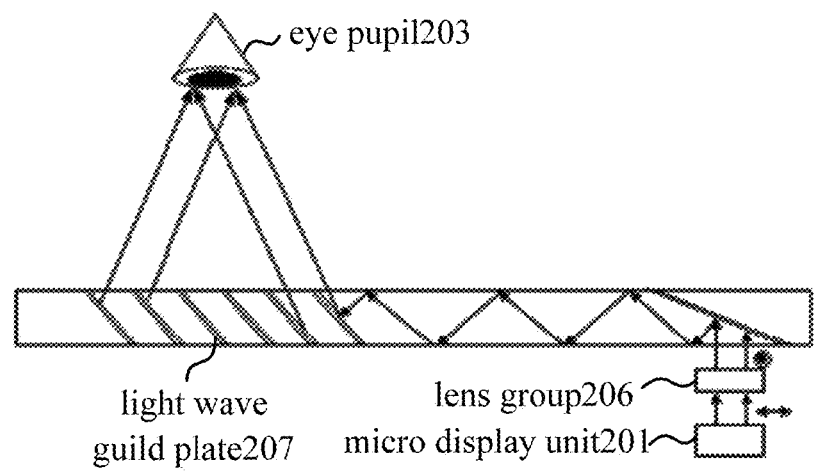

FIGS. 2B-2D further show three detailed implementations based on the principle diagram shown in FIG. 2A. Particularly, the technical solution in FIG. 2B adopts the mixed refraction and diffraction curved surface design, wherein the lens group 204 corresponds to the optical component 202 shown in FIG. 2A, thereby the required glass volume is reduced. The technical solution in FIG. 2C adopts a free curved surface design, wherein a free curved surface lens group 205 including a curved surface 1, a curved surface 2 and a curved surface 3 corresponds to the optical component 202 shown in FIG. 2A, thereby the required glass volume is further reduced. The technical solution in FIG. 2D adopts a parallel plate design, wherein except for the lens group 206 corresponding to the optical component 202 shown in FIG. 2A, a light waveguide plate 207 is also included. By using the light waveguide plate 207, a control such as a translation on the exit direction of the light forming the magnified virtual image (i.e., the display direction of the magnified virtual image) can be performed while the required glass thickness is reduced. It is easily to be understood by those skilled in the art that the near-to-eye optical display system adopted in the electronic device according to the first embodiment of the present disclosure is not limited to those shown in FIGS. 2B-2D, but can adopt other implementations such as the projective eyepiece design.

Figure 3A:
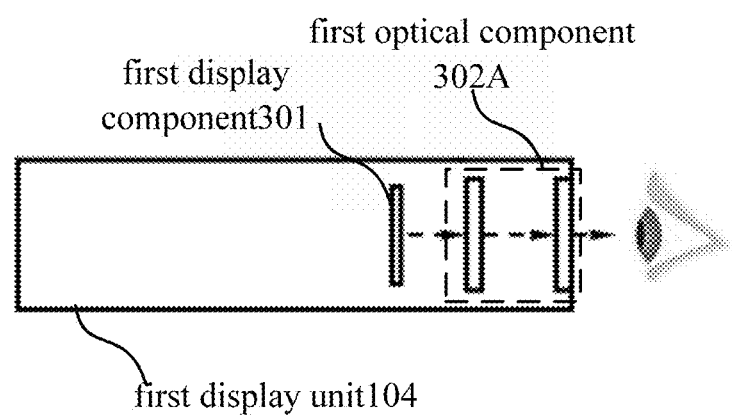
FIGS. 3A-3C are schematic diagrams showing a display unit in the electronic device according to the first embodiment of the present disclosure.
Figure 3B:
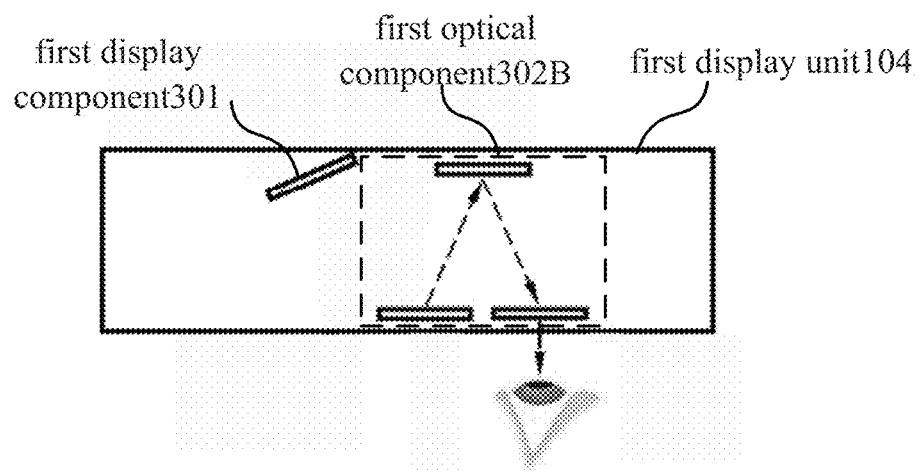
Figure 3C:
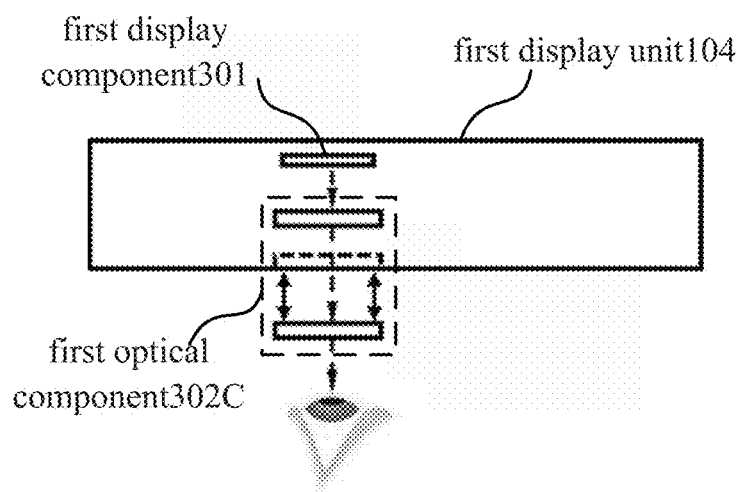

FIGS. 3A-3C are schematic diagrams showing a display unit in the electronic device according to the first embodiment of the present disclosure. The first display unit 104 in the electronic device 100 according to the first embodiment of the present disclosure adopts the near-to-eye optical display system as described above with reference to FIG. 2. The first display unit 104 includes a first display component 301 which displays the first image, and a first optical component 302 (the first optical components 302A-302C in FIGS. 3A-3C) which receives light corresponding to the first image emitted from the first display component 301, and changes the light path of the light corresponding to the first image to form a magnified virtual image corresponding to the first image.

Particularly, in FIG. 3A, the first display component 301 may be the micro display, and the first optical component 302A is formed by the lens group. The lens group forms the magnified virtual image corresponding to the first image displayed by the first display component 301.

In FIG. 3B, the first display component 301 may also be a micro display, and the first optical component 302B is formed by an optical device reflecting multiple times in the electronic device. In this case, compared to the first optical component 302A shown in FIG. 3A, the space necessary for the first display unit 104 may be saved, and it is convenient for the design and manufacture of the further minimized electronic device.

In FIG. 3C, the first display component 301 may also be a micro display, and the first optical component 302C is formed by a zoom lens group driven by a driving unit (not shown) in the electronic device. In this case, compared to the first optical component 302A shown in FIG. 3A, the size of the magnified virtual image displayed by the first display unit 104 may be adjusted dynamically by zooming, so as to meet different user requirements. In this way, by displaying a magnified virtual image using the display component and the optical system, it is not limited by the size of the wearable electronic device such as the smart watch itself, and the image or video display with a larger size and a higher definition is provided with a relatively small display screen.

Also, compared to the micro projector for displaying a large image, the power consumption of the electronic device is low, and it is not limited by the usage scene, and well usage privacy is provided.

In the electronic device 100 described above with reference to FIGS. 1A-1C and FIGS. 3A-3C, at least a part of the first optical component 302 is a component the transmittance of which meets a predetermined condition in the outward direction of the annular space or the approximate annular space. The at least a part of the first optical component 302 is a region corresponding to the display image when displaying. More generally, the transmittance of the electronic device 100 meets a predetermined condition in the outward direction of the annular space or the approximate annular space corresponding to the at least a part of the first optical component 302. The predetermined condition may be that the transmittance is larger than or equal to a predetermined value (such as 70%). In this way, the user may see his/her skin through the electronic device 100.

Figure 4:
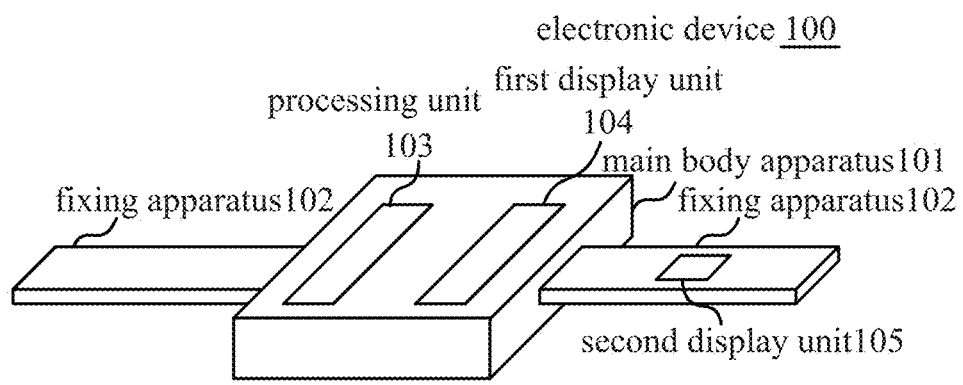
FIG. 4 is a structural diagram showing an electronic device according to a second embodiment of the present disclosure.

FIG. 4 is a structural diagram showing an electronic device according to a second embodiment of the present disclosure. Compared to the electronic device 100 according to the first embodiment of the present disclosure described above with reference to FIGS. 1A-1E, the electronic device 200 according to a second embodiment of the present disclosure shown in FIG. 4 further includes a second display unit 105. The type of the second display unit 105 is different from that of the first display unit 104. For example, the second display unit 105 includes, but not limited to, a liquid crystal display (LCD) unit, an organic electro luminescence display unit, an organic light emitting diode (OLED) display unit, or an E Ink type display unit, etc.

One of the first display unit 104 and the second display unit 105 is arranged on the main body apparatus 101, and the other one is arranged on the fixing apparatus 102. As shown in FIG. 4, the first display unit 104 is arranged on the main body apparatus 101, and the second display unit 105 is arranged on the fixing apparatus 102. Of course, the second display unit 105 may be arranged on the main body apparatus 101, and the first display unit 104 is arranged on the fixing apparatus 102. Similarly to the first display unit 104, the display direction of the second display unit 105 is the outward direction of the annular space or the approximate annular space. Generally, the second display unit 105 is used to display content which does not need to be magnified, such as time indication, etc.

Also, it is not limited to the case shown in FIG. 4, the first display unit 104 and the second display unit 105 may be arranged on the main body apparatus 101 or the fixing apparatus 102 at the same time. For example, the first display unit 104 and the second display unit 105 are arranged on the main body apparatus 101 side by side. Alternatively, the first display unit 104 and the second display unit 105 are arranged on two opposite locations across the radial direction of the fixing apparatus 102.

Figure 5:
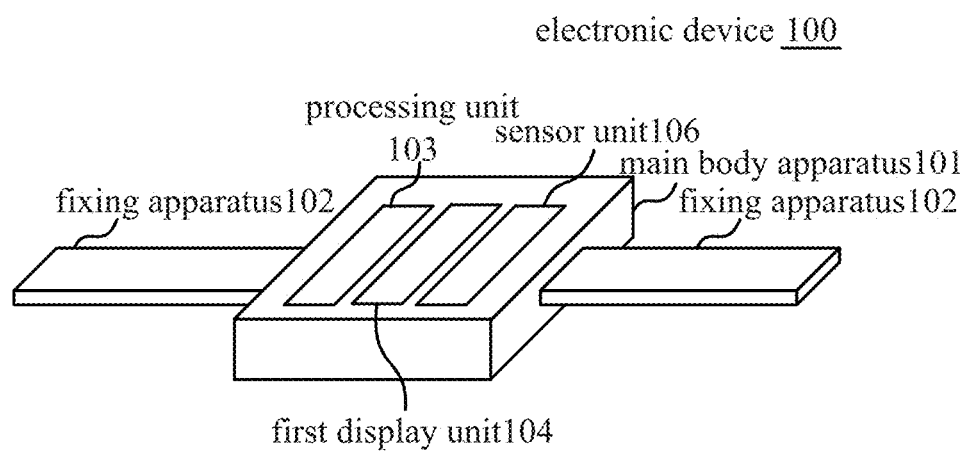
FIG. 5 is a structural diagram showing an electronic device according to a third embodiment of the present disclosure.

FIG. 5 is a structural diagram showing an electronic device according to a third embodiment of the present disclosure. Compared to the electronic device 100 according to the first embodiment of the present disclosure described above with reference to FIGS. 1A-1E, the electronic device 300 according to a third embodiment of the present disclosure shown in FIG. 5 further includes a sensor unit 106. As shown in FIG. 5, the sensor unit 106 is arranged on the main body apparatus 101. However, the sensor unit 106 may also be arranged on the fixing apparatus 102.

The sensor unit 106 is used to generate a first control signal when sensing that the first predetermined condition is met. The processing unit 103 controls the on/off of the first display unit 104 according to the first control signal. In an embodiment of the present disclosure, the sensor unit 106 is an acceleration sensor, the acceleration component value in the gravity direction of the first control signal is larger than or equal to a predetermined value (that is, the user pulls down the electronic device 100 from the use state in which the first display unit 104 is watched), and the processing unit 103 controls to turn down the first display unit 104 according to the first control signal. It will be easily understood by those skilled in the art that the sensor unit 106 according to the embodiment of the present disclosure is not limited to the acceleration sensor, but may include other sensor unit which can generate the control signal.

Figure 6A:
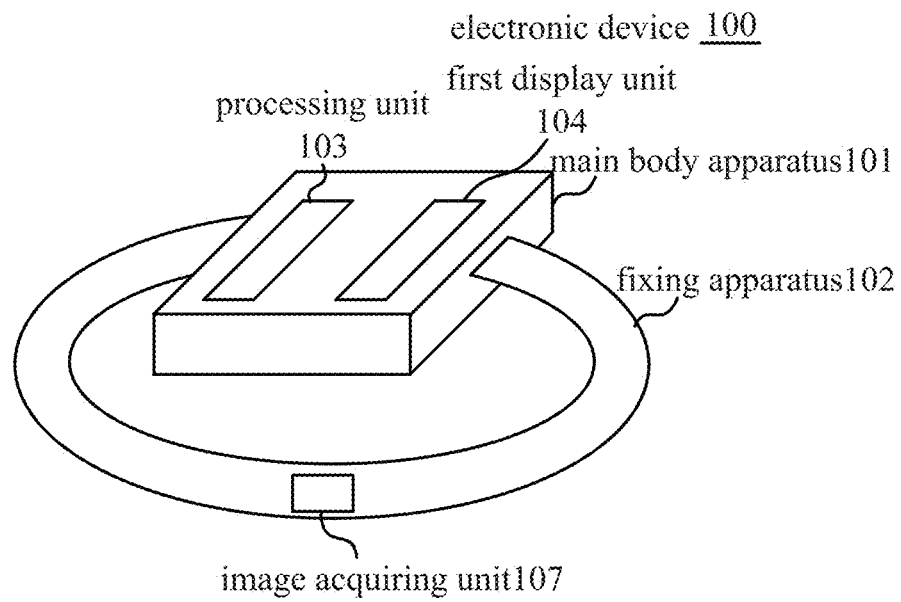
FIGS. 6A and 6B are structural diagrams showing an electronic device according to a fourth embodiment of the present disclosure.
Figure 6B:
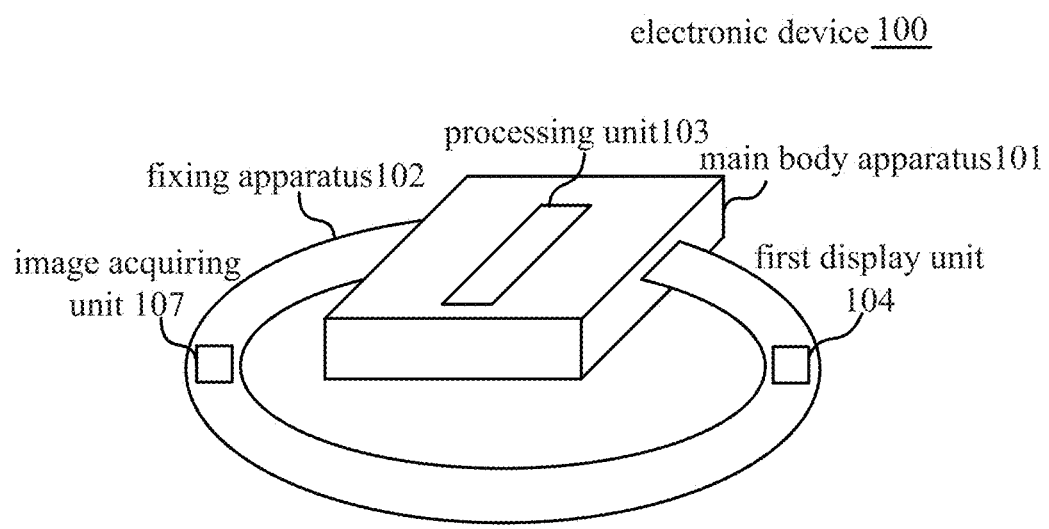

FIGS. 6A and 6B are structural diagrams showing an electronic device according to a fourth embodiment of the present disclosure. Compared to the electronic device 100 according to the first embodiment of the present disclosure described above with reference to FIGS. 1A-1E, the electronic device 400 according to the fourth embodiment of the present disclosure shown in FIGS. 6A and 6B further includes an image capturing unit 107. The image capturing unit 107 may be arranged on the main body apparatus 101 or the fixing apparatus 102. Particularly, FIG. 6A shows the case in which the first display unit 104 is arranged on the main body apparatus 101 and the image capturing unit 107 is arranged on the fixing apparatus 102. FIG. 6B shows the case in which both the first display unit 104 and the image capturing unit 107 are arranged on the fixing apparatus 102. No matter the case in FIG. 6A or FIG. 6B, the image capturing direction of the image capturing unit 107 is opposite to an image output direction of the first display unit 104 in the radial direction of the annular space or the approximate annular space.

In an embodiment of the present disclosure, the image capturing unit 107 is used to capture an interaction action of the user to generate a first image capturing signal, the processing unit 103 converts the first image capturing signal into a second control signal to control the first display unit 104 to display the second image.

In another embodiment of the present disclosure, the image capturing unit 107 is used to capture a first sub image in the image capturing direction, and the processing unit 103 generates a second sub image which may be an identification image about the first sub image acquired by analyzing the first sub image, and may also be an identification image acquired based on the sensor such as the GPS sensor. Also, the second sub image may also be an identification image acquired from a server through network based on feature information acquired from the first sub image. The first sub image is superimposed with the second sub image to generate the first image for display by the first display unit 104.

Figure 7:
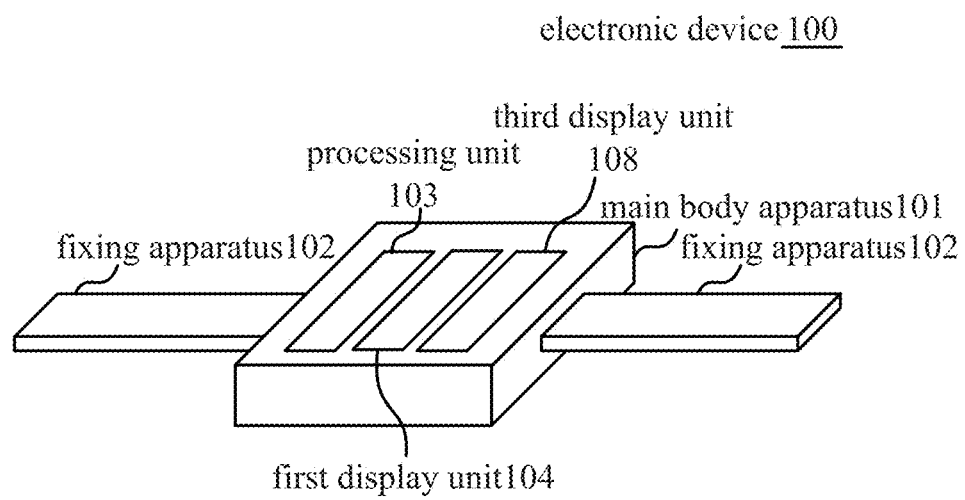
FIG. 7 is a structural diagram showing an electronic device according to a fifth embodiment of the present disclosure.

FIG. 7 is a structural diagram showing an electronic device according to a fifth embodiment of the present disclosure. Compared to the electronic device 100 according to the first embodiment of the present disclosure described above with reference to FIGS. 1A-1E, the electronic device 500 according to the fifth embodiment of the present disclosure shown in FIG. 7 further includes a third display unit 108. In the electronic device 100 shown in FIG. 7, the third display unit 108 is arranged on the main body apparatus 101 together with the first display unit 104. It will be easily understood that the present disclosure is not limited thereto. The third display unit 108 may be arranged on the fixing apparatus 102 together with the first display unit 104.

The third display unit 108 is a display unit with the same type as that of the first display unit 104. That is, the third display unit includes a second display component (not shown) for displaying the third image, and a second optical component (not shown) for receiving light corresponding to the third image emitted from the second display component and changing the light path of the light corresponding to the third image to form a magnified virtual image corresponding to the third image. The third image is related to the first image. When both eyes of the viewer watches the first display unit 104 and the third display unit 108 respectively, the viewer is enabled to be aware of a 3D image corresponding to the first image and the third image.

The electronic device according to the embodiments of the present disclosure has been described above with reference to FIGS. 1A to 7. In the following, the display method used by the electronic device will be described with reference to FIG. 8.

Figure 8:
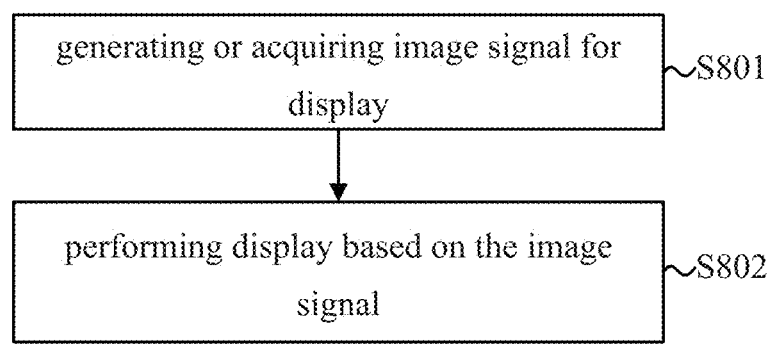
FIG. 8 is a flowchart showing a display method according to a first implementation of the present disclosure.

FIG. 8 is a flowchart showing the display method according to an embodiment of the present disclosure. The display method shown in FIG. 8 is applied to the electronic device shown in FIG. 1. As described above, the electronic device includes a main body apparatus having a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image.

The display method includes generating or acquiring an image signal for display (step S801); and performing display based on the image signal (step S802).

In the step S801, the processing unit 103 of the electronic device 100 may generate an image signal for display. Also, the electronic device 100 may acquire the image signal for display from the server or another electronic device through a communication unit. Then, the process goes to the step S802.

In the step S802, the display unit of the electronic device 100 performs displaying based on the image generated or acquired in the step S801. Particularly, as described above, the step of performing displaying may include displaying a magnified virtual image corresponding to the image signal through the display unit including the display component and the optical component. Also, the step of performing displaying may further include generating a control signal based on the signal acquired by the sensor to control the on/off of the display of the image signal, etc. Further, the step of performing displaying may further include displaying a magnified 3D virtual image corresponding to the image signal through two display units including the display component and the optical component.

(Second Implementation)

Figure 9:
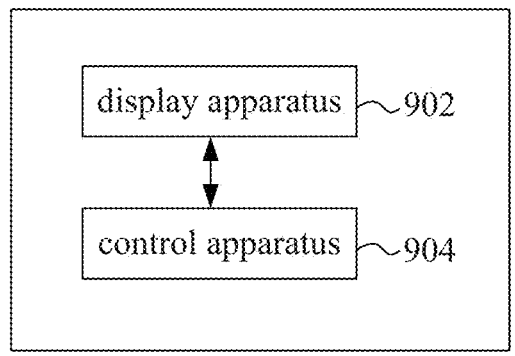
FIG. 9 is a block diagram showing a functional configuration of a display device according to an embodiment of the present disclosure.

Next, the display device according to an embodiment of the present disclosure will be described with reference to FIG. 9. As shown in FIG. 9, the display device 900 includes a display apparatus 902 and a control apparatus 904.

The display apparatus 902 is capable of displaying image with two display modes.

The control apparatus 904 is coupled with the display apparatus. It controls the display apparatus 902 to switch between a first display mode and a second display mode when a predetermined condition is met. The display image viewed by the user is a real image in the first display mode, and the display image viewed by the user is a virtual image in the second display mode. Generally, the real image viewed by the user is a real image of the same size, and the virtual image viewed by the user is a magnified virtual image. Particularly, in the first display mode, the image displayed by the display apparatus is of a first area, and the image felt by the user is an image of a first area, i.e., the display image viewed by the user is a real image of the same size as the display area. In the second display mode, the image displayed by the display apparatus is of a first area, and the image felt by the user is an image of a second area larger than the first area, i.e., the display image viewed by the user is a virtual image with an area larger than the display area. For example, in the first display mode, if the size of the image displayed by the display apparatus is 10 cm×15 cm, the size of the image felt by the user is 10 cm×15 cm, i.e., a real image of the same size. In the second display mode, if the size of the image displayed by the display apparatus is 10 cm×15 cm, the size of the image felt by the user is 20 cm×30 cm, i.e., a magnified virtual image.

The display device according to an embodiment of the present disclosure may be applied to smart devices of various types, such as the smart phone, the tablet, or the smart watch or the like. However, the present disclosure is not limited thereto. Those skilled in the art may understand that the display device according to an embodiment of the present disclosure may be applied to any device related to a display component properly.

With the two display modes described above, the user may watch an image of a normal size and an image of a large size according to requirement, so that the user experience may be further improved.

The predetermined condition triggering the switching mentioned above may be a manual trigger by the user. For example, the user may trigger the switching by turning on or turning off a specified button (a physical button or a virtual button). Of course, the present disclosure is not limited thereto. The switching of the display mode may be triggered automatically by detecting a specified parameter. The details about the automatic triggering will be described in the following in detail.

The display region of the display apparatus in the first display mode is a first region, and the display region of the display apparatus in the second display mode is a second region. The first region and the second region may be tiled, for example, arranged from left to right or uppermost to lowermost side by side on the display surface. Although the configuration of tiling the first region and the second region may realize the two display modes improving the user's watching experience, the problem is that the view focus needs to be changed when switching between the two display modes, resulting in a bad user experience. The first region and the second region may be realized by two display sub apparatuses of the same type or different types, respectively. That is, the first region and the second region may be at the same display apparatus, or the first region is at the first display sub apparatus and the second region is at the second display sub apparatus.

In view of this, alternatively, the first region and the second region may be at least partly overlapped. With such configuration, the changing amount of the view focus may be reduced to some extent, which helps to improve the user experience. However, when the first region is at the first display sub apparatus and the second region is at the second display sub apparatus, since the first region and the second region are at least partly overlapped, the thickness of the device is increased and the portability is not good.

However, as an optional implementation, the first region and the second region are at the same display apparatus, and they are at least partly overlapped. Optionally, the first region and the second region are entirely overlapped, or the first region is larger than and contains the second region. In other words, the two display modes are realized by a single, i.e., the same display apparatus. Compared to the solution of realizing multiple display modes by two or more display sub apparatuses of the same type or different types, it can reduce the changing amount of the visual focus to the minimum, and can reduce the size and the cost of the device.

Next, the predetermined condition triggering the switching between the first display mode and the second display mode will be described in detail.

Considering such a scene that the display device is in the first display mode, i.e., the normal display mode, when the distance between the user eye and the display device is a normal watching distance. In the first display mode, the user feels the image of the same size as the display region of the display device. When the distance between the user eye and the display device is smaller than the normal watching distance, the display device is in the second display mode, i.e., the near-to-eye display mode. In the second display mode, the user feels the image larger than the display region of the display device.

Figure 10:
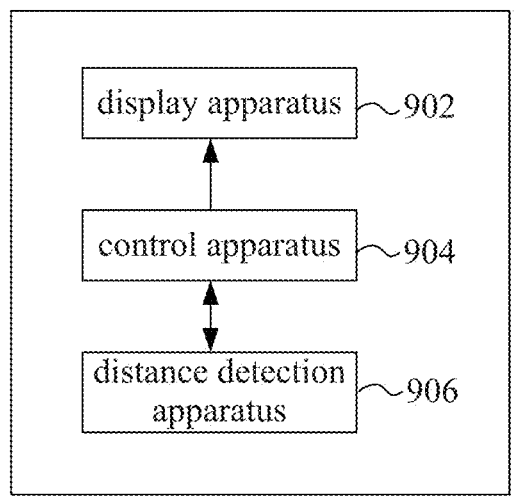
FIG. 10 is a block diagram showing a functional configuration of a display device according to a sixth embodiment of the present disclosure.

In this scene, as a possible implementation, the predetermined condition may be a predetermined condition about distance. Particularly, in this scene, as shown in FIG. 10, the display device 900 may further include a distance detection apparatus 906. The distance detection apparatus 906 is arranged near the display apparatus, the detection direction of which is towards a viewable space of the display apparatus. The distance detection apparatus 906 is used to detect a distance parameter between an object and the display apparatus. The predetermined condition is that the distance between the object and the display apparatus is smaller than a first threshold.

The distance detection apparatus 906 may be an apparatus detecting the distance value accurately. For example, the distance detection apparatus 906 may be a distance sensor based on the flying time method, which computes the distance with an object by emitting a very short light pulse, measuring the time of the light pulse from the emission to the reflecting back by the object and measuring the time interval. In this case, the distance detection apparatus 906 detects the distance between the object and the display apparatus accurately, and compares the measured distance value with the first threshold.

Of course, the distance detection apparatus 906 is not limited to the above example. Alternatively, the distance detection apparatus 906 may be an apparatus detecting the distance value not so accurately. Particularly, the distance detection apparatus 906 may be such an infrared emitter, which is configured to enable the object in a distance range of a first threshold to receive the infrared ray emitted by it. That is, the object beyond the distance range cannot receive its emitted infrared ray. In this case, if the distance between the object and the display apparatus is larger than the first threshold, i.e., if the object is outside of the above distance range, the object cannot receive the emitted infrared ray. On the contrary, if the distance between the object and the display apparatus is smaller than the first threshold, i.e., if the object is within the above distance range, the object can receive the emitted infrared ray and reflect the infrared ray back to the emitter. If the infrared emitter receives the reflected infrared ray, it can be determined that the distance between the object and the display apparatus is smaller than the first threshold.

The above example does not limit the present disclosure. Those skilled in the art may understand that any other distance detection apparatus capable of determining whether the distance between two objects meets a specified value relationship or not should be contained in the scope of the present disclosure.

The display apparatus 900 may be switched from the normal display mode to the near-to-eye display mode automatically by determining whether the distance between the object and the display apparatus is smaller than the first threshold or not, and the user operation is facilitated. However, the problem of this way is the error determination. For example, when the display device according to an embodiment of the present disclosure is applied to the smart watch, the case of the distance between the sleeve and the display apparatus being smaller than the first threshold may occur in winter. Alternatively, when the display device according to an embodiment of the present disclosure is applied to the smart phone, the case of the distance between the casing of the phone and the display screen being smaller than the first threshold may occur. The above listed cases should not be considered as the condition for triggering the switch of the display mode.

In order to solve the problem, as an optional implementation, the predetermined condition may further include that the distance between the object and the display apparatus is larger than a second threshold.

The error determination due to the blocking of an unexpected object may be avoided effectively by further detecting whether the distance between the object and the display apparatus is larger than the second threshold.

When it is detected that the distance between the object and the display apparatus is smaller than the second threshold, for example, the case of the sleeve blocking the display device as described above, the display apparatus enters a third display mode, and turns down the display apparatus or enters a low power consumption state at this time. Here, the low power consumption sate refers to a state in which the power consumption is lower than that in the normal display.

Further, other types of error determinations are possible. For example, the object detected by the distance detection apparatus 906 is not the user's eye. This case should not be viewed as the condition triggering the switch of the display mode as well.

Figure 11:
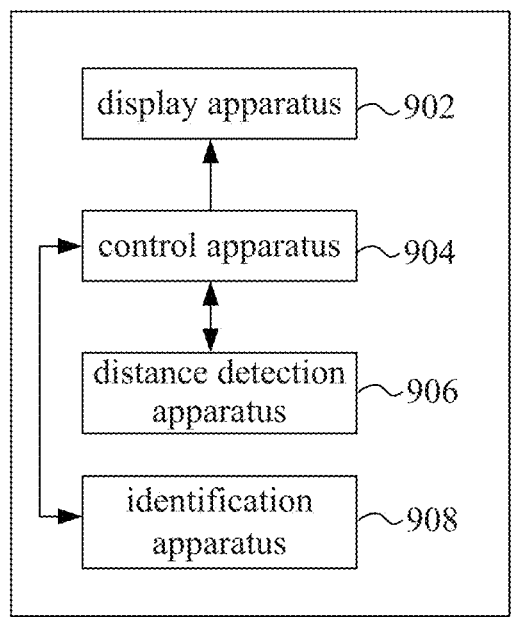
FIG. 11 is a block diagram showing a functional configuration of a display device according to a seventh embodiment of the present disclosure.

In order to solve the problem, as an optional implementation, as shown in FIG. 11, the display device 900 may further include an identifying apparatus 908. The identifying apparatus 908 is arranged near the display apparatus, which identifies whether the user's eyeball is watching the display apparatus in the viewable space faced by the display apparatus. At this time, the predetermined condition further includes that the user's eyeball is watching the display apparatus correspondingly. Particularly, the predetermined condition may be that the distance between the object and the display apparatus is smaller than the first threshold and the user's eyeball is watching the display apparatus, or may be that the distance between the object and the display apparatus is smaller than the first threshold and larger than the second threshold and the user's eyeball is watching the display apparatus.

Further, the processing by the distance detection apparatus 906 and the processing by the identifying apparatus 908 may be done serially. That is, the work of the identifying apparatus 908 may be initiated after the distance detection apparatus 906 determines that the distance condition is met, or the work of distance detection apparatus 906 is initiated after the identifying apparatus 908 determines that the eyeball condition is met. Alternatively, the processing by the distance detection apparatus 906 and the processing by the identifying apparatus 908 may be done in parallel.

The identifying apparatus 908 may further include an image capturing unit for capturing image of an object; an image analyzing unit for analyzing the image to determine whether the user's eyeball is watching the display apparatus. For example, whether the user's eyeball is watching the display apparatus or not may be determined by performing the face recognition by photographing images. Alternatively, whether the user's eyeball is watching the display apparatus or not may be determined by the red eye effect in the photographed image. Of course, the present disclosure is not limited thereto, and any technology capable of detecting or determining the user's eyeball may be applied to the present disclosure properly.

Next, a first example of a detailed configuration of the display apparatus included in the display device according to an embodiment of the present disclosure will be described with reference to FIG. 12 in detail.

Figure 12:
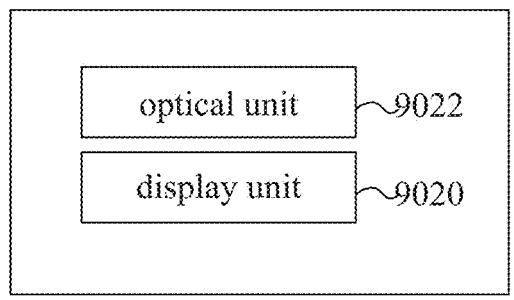
FIG. 12 is a block diagram showing a configuration of a display apparatus according to an embodiment of the present disclosure.

As shown in FIG. 12, the display apparatus 902 comprises a display unit 9020 and an optical unit 9022. The optical unit 9022 covers the display unit 9020 and meets a predetermined transmittance, so that the user can view the image displayed on the display component via the optical unit. The display unit 9020 is a normal display in the prior art, such as liquid crystal display (LCD), an organic electro-luminescence display or an organic light emitting diode (OLED) display etc.

The optical unit 9022 has two optical modes, the optical unit is in a first optical mode in the first display mode, and is in a second optical mode in the second display mode.

The detailed configuration of the optical unit 9022 will be described with reference to FIGS. 13A and 13B in detail. The optical unit 9022 is constructed of a shape changeable cavity and filled-in liquid. FIG. 13 shows a first optical mode of the optical unit 9022. As shown in FIG. 13, in the first display mode, the shape changeable cavity does not change its shape and maintains a first shape. For example, the first shape may be a plate shape. The optical unit in the first optical mode may be viewed as a transparent glass covering the display unit 9020. Thereby, the user views a real image of the same size with the image displayed on the display component via the shape changeable cavity. FIG. 13B shows a second optical mode of the optical unit 9022. As shown in FIG. 13B, in the second display mode, the shape changeable cavity changes its shape to a second shape. That is, the optical unit is of a shape with a predetermined curvature. The optical unit in the second optical mode may be viewed as a lens group covering the display unit 9020. Thereby, the user views a magnified virtual image of the display image on the display unit via the shape changeable cavity.

Figure 13A:
FIGS. 13A and 13B show different optical modes of an optical unit according to an embodiment of the present disclosure.
Figure 13B:

It is to be noted that FIGS. 13A and 13B show the case in which the optical unit is formed by three shape changeable cavities. However, the present disclosure is not limited thereto. The optical unit according to an embodiment of the present disclosure may be formed by only a single shape changeable cavity, or may be formed by two or more than three shape changeable cavities.

The shape of the shape changeable cavity may be changed by changing the volume of the filled-in liquid. In general, with no liquid or almost no liquid, the shape changeable cavity can maintain a first shape. After being filled in with a certain amount of liquid, the shape changeable cavity may change its shape to a second shape. The shape changeable cavity may be changed to different shapes by controlling the filled-in amount of the liquid by the control apparatus. For example, in the single shape changeable cavity case, the curvature of the second shape of the shape changeable cavity is small when the filled-in amount of the liquid controlled by the control apparatus is small. When the control apparatus controls to further increase the filled-in amount of the liquid, the curvature of the second shape of the shape changeable cavity is large.

An example of changing the shape of the shape changeable cavity by changing the volume of the filled-in liquid in the shape changeable cavity has been described above. As another possible implementation, the shape of the shape changeable cavity may be changed by changing the outer frame of the shape changeable cavity. In general, the outer frame of the optical unit may be configured by using memory alloy. In a lower temperature, the memory alloy does not change its shape and maintains the first shape. In a higher temperature, the memory alloy changes its shape to the second shape. The adjustment of the temperature may be done by the control apparatus. For example, the display device may further include a heater circuit arranged near the memory alloy for heating the memory alloy. The control apparatus may control the work power of the heater circuit. When the control apparatus controls so that the heater circuit is at a nominal power state, the temperature goes up quickly. When the control apparatus controls so that the heater circuit is at a lower power, the temperature goes up slowly. When the control apparatus controls so that the heater circuit is turned off, the temperature remains unchanged or goes down slowly. Thereby, the memory alloy changes its shape by the temperature change.

Further, the optical unit constructed of the shape changeable cavity and the filled-in liquid is only an example. Alternatively, the optical unit may be manufactured by a material of a solid structure having a predetermined property. Those skilled in the art should understand that the present disclosure is not limited to the above example. Any other shape changeable optical unit should be included in the scope of the present disclosure.

The first example of the detailed configuration of the display apparatus included in the display device according to an embodiment of the present disclosure has been described above. In the first example, generally, the switch between the first display mode and the second display mode is realized by the shape changing of the optical unit.

Next, a second example of the detailed configuration of the display apparatus included in the display device according to an embodiment of the present disclosure will be described in detail.

In the second example, the user views the magnified virtual image via an optical attachment in the second display mode.

The optical attachment may be a device independently from the display device, such as a single lens or a lens group capable of magnifying the image. Alternatively, the optical attachment may be a device integrated with the display device. When the optical attachment is integrated with the display device, the locations of the optical attachment with respect to the display apparatus are different in the first display mode and the second display mode, and the optical attachment covers at least a part of region of the display apparatus in the second display mode.

Figure 14A:
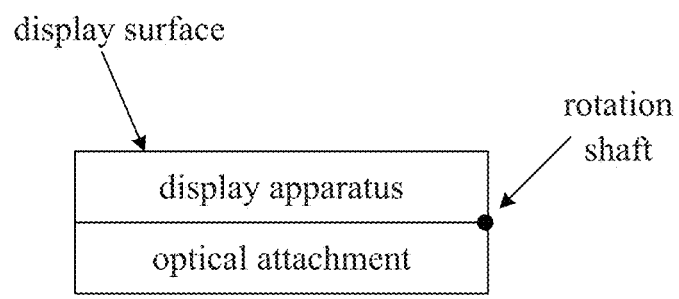
FIGS. 14A and 14B are diagrams showing a case in which an optical attachment covers the entire display surface of the display apparatus.
Figure 14B:
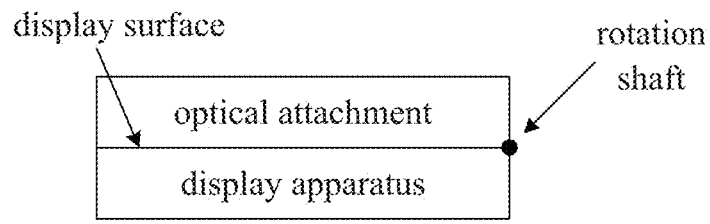

As a possible implementation, the optical attachment may adopt the flip manner. FIG. 14A shows a location state of the optical attachment in the first display mode. As shown in FIG. 14A, the optical attachment is connected with the display apparatus via a rotation shaft. In the first display mode, the optical attachment is flipped to the back side (i.e., a side opposite to the display surface) of the display apparatus via the rotation shaft. FIG. 14B shows the location state of the optical attachment in the second display mode. As shown in FIG. 14B, the optical attachment is flipped to the front side (i.e., the display surface side) of the display apparatus via the rotation shaft.

It is to be noted that FIGS. 14A and 14B show the case in which the optical attachment covers the entire display surface of the display apparatus. However, the present disclosure is not limited thereto, and the optical attachment may only cover a part of the display surface of the display apparatus.

Also, the above flip type optical attachment is only an example. Any other structure capable of changing the location of the optical attachment with respect to the display apparatus may be applied to the present disclosure properly.

The detailed configuration of the optical attachment in the second example of the display apparatus has been described above. In the second example, the function of the optical attachment is to magnify the image in the second display mode. Therefore, in order to cooperate with the function of magnifying image in the second display mode by the optical attachment, the display apparatus is configured to be capable of display the image with two resolutions.

In the following, the detailed configuration of the display apparatus in the second example will be described in detail.

As a possible implementation in the second example, the display apparatus includes a first resolution display part in the first region, which is capable of displaying image with a first resolution; and a second resolution display part in the second region, which is capable of displaying image with a second resolution higher than the first resolution; in the first display mode, both the first resolution display part and the second resolution display part display image with the first resolution; in the second display mode, only the second resolution display part display image with the second resolution.

That is, the display apparatus is divided into the high resolution display part and the low resolution display part by hardware. In the normal display mode, the low resolution display part works to display the image with the low resolution. In the near-to-eye display mode, the high resolution display part works to display the image with the high resolution. The user views a magnified virtual image of the image with the second resolution via the optical attachment in the second display mode. The purpose of such configuration is to ensure that the image magnified by the optical attachment in the near-to-eye display mode maintains a high image quality.

Since the display apparatus is divided into the high resolution display part and the low resolution display part by hardware, the locations of the first region and the second region are fixed and cannot be changed.

By the configuration of dividing the display apparatus into the high resolution display part and the low resolution display part by hardware, and by the cooperation with the optical attachment as described above, it is possible to realize the switch between the first display mode and the second display mode to meet different user watching requirements.

As another possible implementation in the second example, different from the manner of dividing the display apparatus into the high resolution display part and the low resolution display part by hardware as described above, the whole display apparatus is configured to be a display apparatus with the second resolution. That is, different from the case in which the low resolution display part in the display apparatus can only display with the low resolution as described above, the whole display apparatus may select one of the low resolution and the high resolution to perform display depending on situation.

In the first display mode, the image is displayed in the first region with the first resolution, and displayed in the second region with the second resolution higher than the first resolution. The user views a virtual image of the image with the second resolution in the second display mode via the optical attachment.

Based on such configuration, different from the case in which the locations of the first region and the second region are fixed as described above, the locations of the first region and the second region are changed, and are determined by the control apparatus. That is, the control apparatus determines the location of the second region based on the acquired parameter.

The determination of the locations of the first region and the second region may adopt the following manners.

First, the locations of the first region and the second region may be determined by the user touch. Of course, the premise of this manner is the display apparatus being a touch display apparatus. Particularly, before display with the first display mode and display with the second display mode, first, a dialog box prompting the user to circle the display region is displayed respectively. Then, the user circles the display region by a finger, or a touch pen etc. The shape of the display region may be a rectangular, a circle or any other shape. Also, the entire display region of the display apparatus may be set by default as the first region. At this time, the location of the second region is determined only by the user touch. Similar to that described above, before display with the second display mode, first, a dialog box prompting the user to circle the display region is displayed respectively. Then, the user circles the second region by a finger, or a touch pen etc. The shape of the second region may be a rectangular, a circle or any other shape.

Second, the location of the second region may be determined by the location of the eyeball. Particularly, the location of the user's eyeball may be determined by an eyeball location apparatus. Then, the region of a predetermined area including a location corresponding to the location of the eyeball in the entire display region of the display apparatus is set as the second region. Similarly, the shape of the second region may be a rectangular, a circle or any other shape.

Third, the location of the second region may be determined by the location of the optical attachment. As described above, the optical attachment may cover the entire display surface of the display apparatus, or may only cover a part of the display surface of the display apparatus. When the optical attachment only covers a part of the display surface of the display apparatus, the location of the optical attachment may be detected first, then the location of the second region may be determined according to the location of the optical attachment. The shape of the display region may correspond to the shape of the optical attachment. The size of the second region may be equal to that of the optical attachment, or may be smaller than that of the optical attachment. For example, an infrared emitter apparatus may be installed on the optical attachment, and an infrared receiving apparatus may be installed on the display apparatus. The region on the display apparatus which receives the infrared signal is the region of the optical attachment, and it may be set as the second region. Of course, the present disclosure is not limited thereto. Any manner that can detect the location of the optical attachment should be included in the scope of the present disclosure.

The above examples are not intended to limit the present disclosure thereto. For example, the locations of the first region and the second region may be configured by default. For example, the first region is the entire display surface, and the second region is a rectangular of the center part of the display surface and the area is ½ of the area of the entire display surface. Alternatively, the first region and the second region may both be the entire display surface. Therefore, those skilled in the art will appreciate that any other manners to determine the locations of the first region and the second region not listed in the description should be included in the scope of the present disclosure.

Figures 15A, 15B:
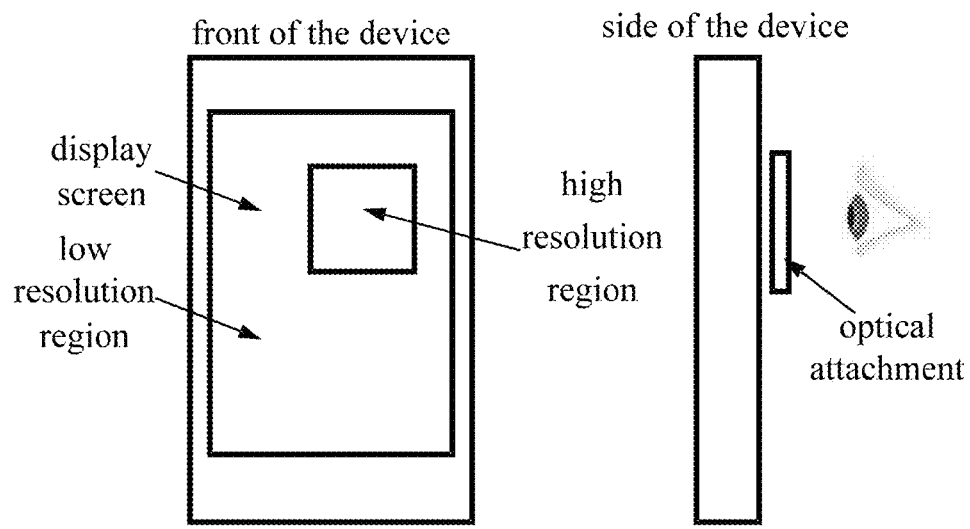
FIGS. 15A and 15B are diagrams showing a case in which one second region is arranged in the display device.
Figures 16A, 16B:
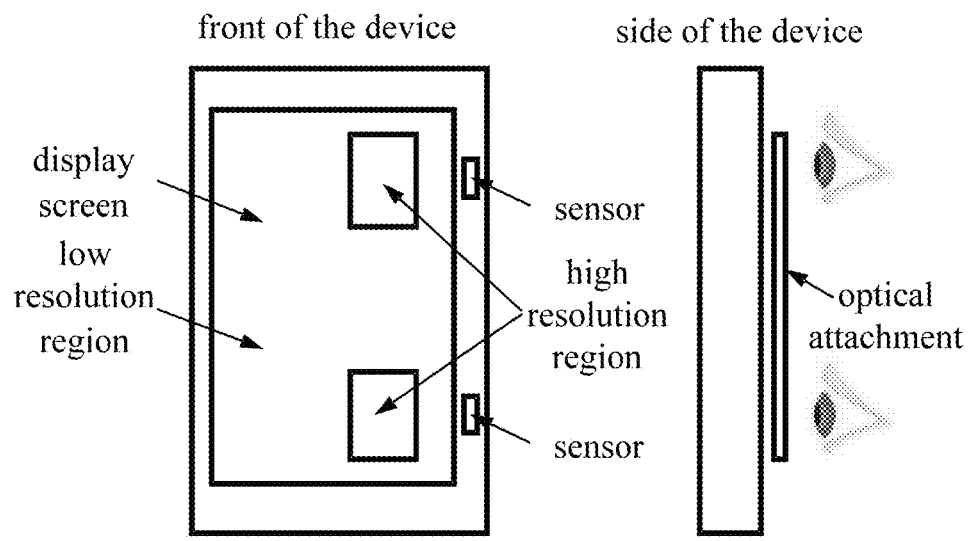
FIGS. 16A and 16B are diagrams showing a case in which two second regions are arrange d in the display device.

In the first example and the second example, the number of the second region may be one. FIGS. 15A and 15B shows a case in which the number of the second region is one, wherein FIG. 15A shows the front of the device, and FIG. 15B shows the side of the device. However, the number of the second region may not be limited to one. For example, FIGS. 16A and 16B show a case in which the number of the second region is two, wherein FIG. 16A shows the front of the device, and FIG. 16B shows the side of the device. Two second regions may be set for the left eye and the right eye of the user respectively, so that the user may feel the 3D image. In this case, as shown in FIG. 16A, two sensors for detecting the location of the eyeballs may be arranged respectively.

In the first display mode and the second display mode, the image displayed by the display apparatus may be the same. That is, the user may view an image of a larger size in the second display mode than in the first display mode. However, the present disclosure is not limited thereto. Alternatively, in the first display mode and the second display mode, the image displayed by the display apparatus may be different. Particularly, the display apparatus displays a first image in the first display mode, and displays a second image in the second display mode, and the control apparatus controls so that the content of the first image and the second image is correlated but different, and the information amount of the second image is larger than that of the first image.

For example, assume that the user is using the navigation function. In the first display mode, limited by the size of the display apparatus, the user is only provided with a brief view of the navigation path, such as an advancing direction. In the second display mode, since the image can be displayed with a larger size, it allows to display richer content to the user. In this case, the control apparatus may control so that the image displayed in the second display mode may further include a full map comprising the names of the passing by locations and street, the names of the nearby locations and streets, or the transportation situation, etc., except for the brief view of the navigation path.

As described above, the display device according to an embodiment of the present disclosure may be applied to a portable smart device including a display such as a smart phone, or a tablet etc., or may be applied to a wearable smart device such as a smart watch.

When the display device is applied to the wearable device such as the smart watch, the display device may further include a fixing apparatus for maintaining a relative location relationship between the display device and at least a part of body of the user when the user wears the display device.

Figure 17A:
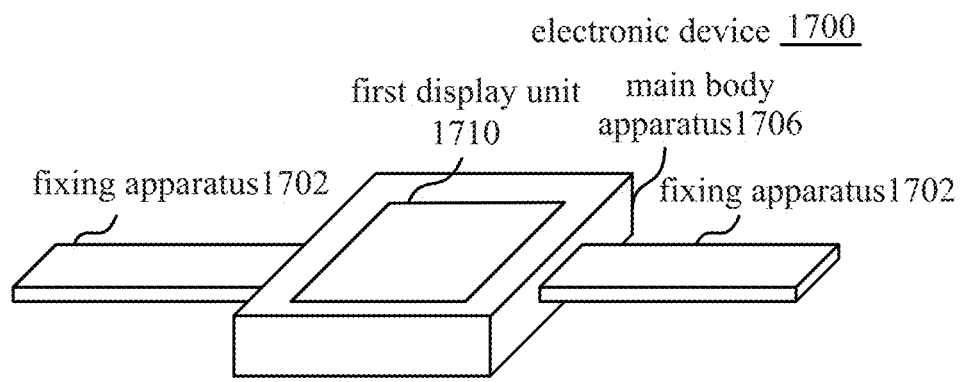
FIGS. 17A-17E illustrate an electronic device to which the display device according to an embodiment of the present disclosure is applied.

Next, a first example of the structural diagram of the electronic device to which the display device according to an embodiment of the present disclosure is applied will be described with reference to FIGS. 17A-17E. As shown in FIG. 17A, the electronic device 1700 according to the embodiment of the present disclosure includes a main body apparatus 1706 and a fixing apparatus 1702. The fixing apparatus 1702 is connected with the main body apparatus 1706. The fixing apparatus 1702 has at least a fixed state in which the fixing apparatus 1702 can be at least a part of an annular space or an approximate annular space meeting a first predetermined condition, the annular space or the approximate annular space being capable of surrounding an outer side of a cylinder meeting a second predetermined condition.

Figure 17B:
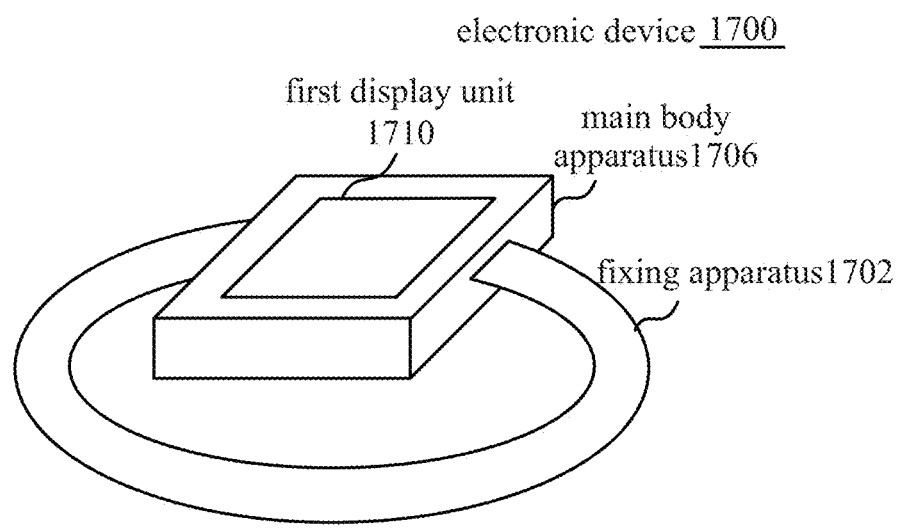
Figure 17C:
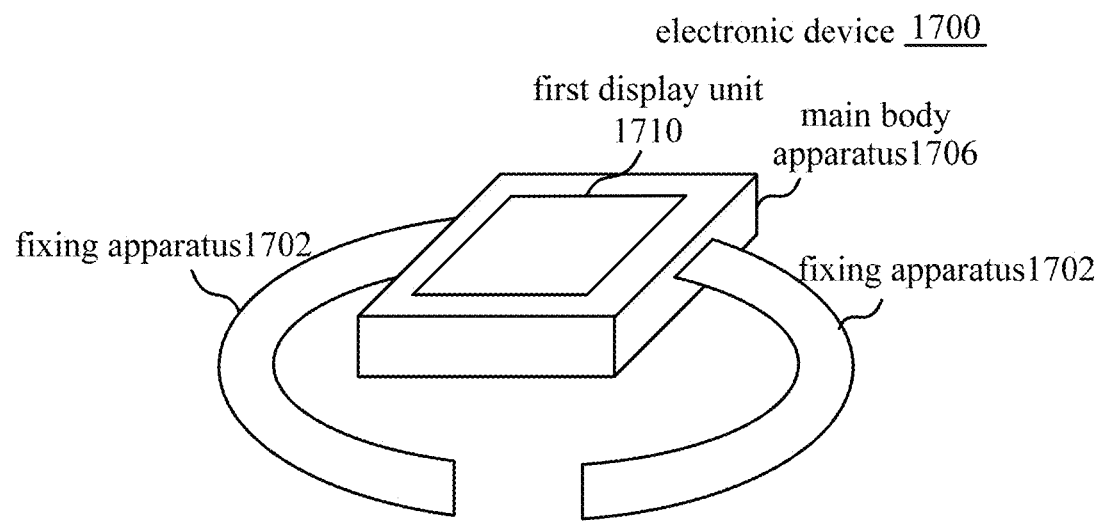

Particularly, FIGS. 17B and 17C are diagrams showing two fixed states in which the fixing apparatus 1702 is connected with the main body apparatus 1706. In the first fixed state as shown in FIG. 17B, the fixing apparatus 1702 and the main body apparatus 1706 form a closed-loop annular space, wherein the fixing apparatus 1702 and the main body apparatus 1706 form a part of the annular space, respectively. In the second fixed state as shown in FIG. 17C, the fixing apparatus 1702 and the main body apparatus 1706 form an approximate annular space with a small opening, wherein the fixing apparatus 1702 and the main body apparatus 1706 form a part of the approximate annular space, respectively. In an embodiment of the present disclosure, the main body apparatus 1706 is a dial section of the smart watch, and the fixing apparatus 1702 is a watchband section of the smart watch. The annular space or the approximate annular space formed by the main body apparatus 1706 and the fixing apparatus 1702 can surround a wrist (as the cylinder) of a user of the smart watch, and the diameter of the annular space or the approximate annular space is larger than the diameter of the wrist of the user and smaller than the diameter of the first of the user.

Figure 17D:
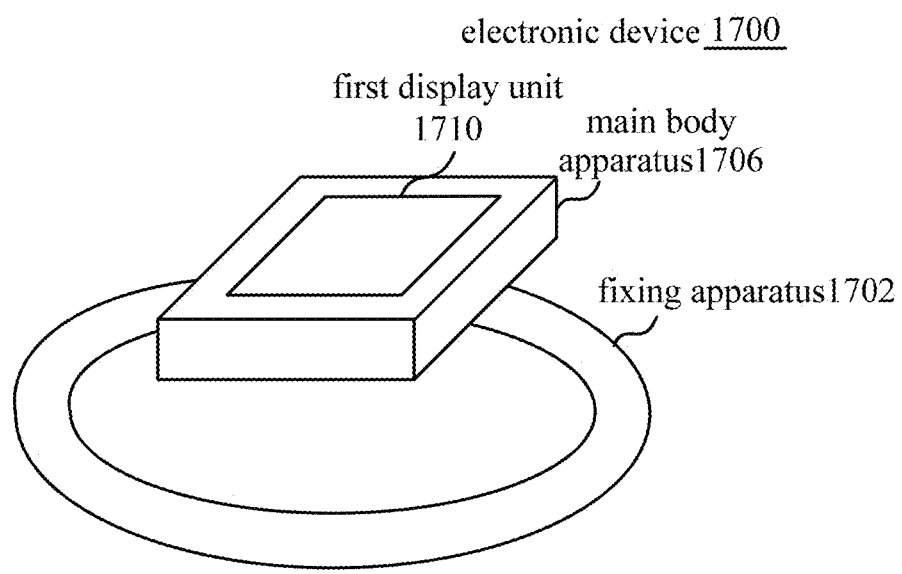
Figure 17E:
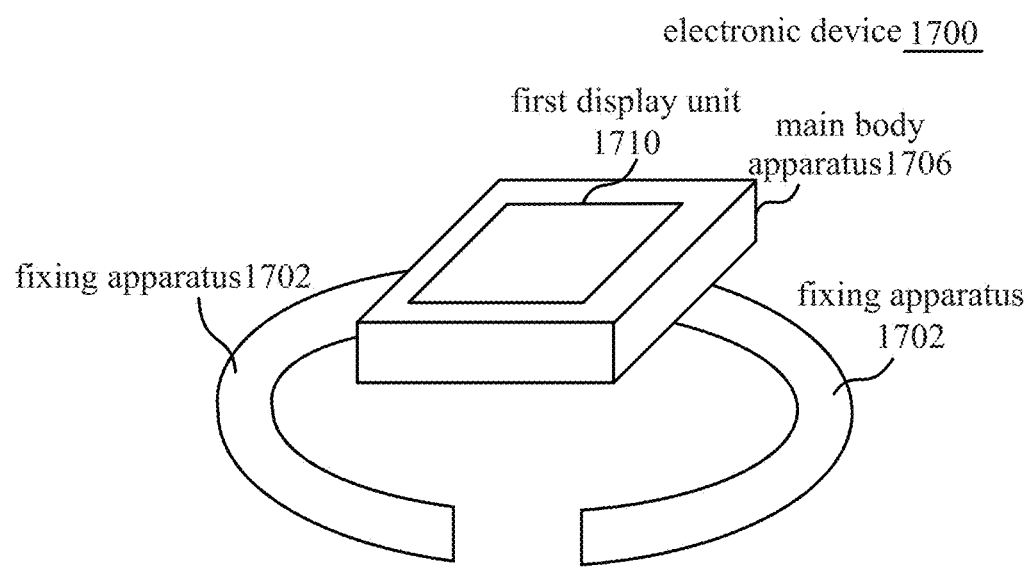

Also, of course, the annular space or the approximate annular space may be formed by the fixing apparatus 1702 alone. As shown in FIGS. 17D and 17E, the main body apparatus 1706 may be arranged on the fixing apparatus 1702 (i.e., the main body apparatus 1706 is attached to the fixing apparatus 1702 by way of surface contact), so that only the fixing apparatus 1702 itself forms the annular space (FIG. 17D) or the approximate annular space (FIG. 17E) surrounding the cylinder from the outside. The fixing apparatus 1702 is arranged with a fixing structure such as an agraffe, a snap fastener or a slide fastener, etc. (not shown).

Further, as shown by FIGS. 17A-17E, the main body apparatus 1706 is arranged with a first display unit 1710 thereon, which is the display device 900 according to an embodiment of the present disclosure described above. The control apparatus 1708 is used to generate a first image and perform display control. In the electronic device 1700 shown in FIGS. 17A-17E, the first display unit 1700 is arranged on the main body apparatus 1706. However, it will be easily understood by those skilled in the art that the present disclosure is not limited thereto. The first display unit 1710 may also be arranged on the fixing apparatus 1702.

Figure 18:
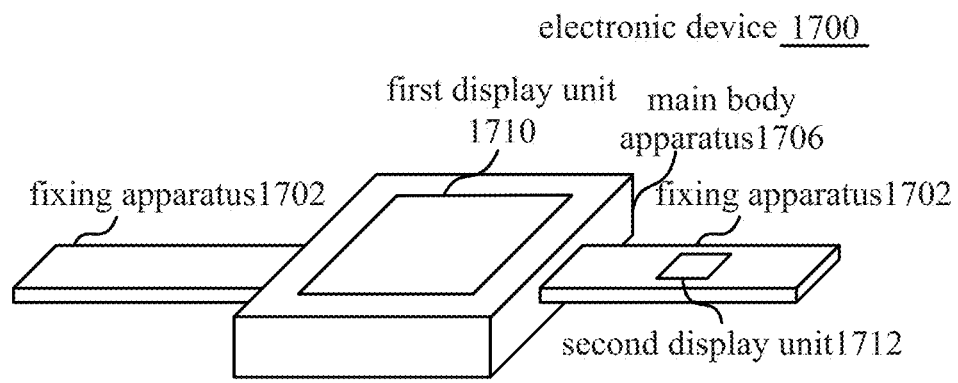
FIG. 18 illustrates an electronic device to which the display device according to an embodiment of the present disclosure is applied.

FIG. 18 is a structural diagram showing an electronic device according to a second embodiment of the present disclosure. Compared to the electronic device 1700 according to the first embodiment of the present disclosure described above with reference to FIGS. 17A-17E, the electronic device 1700 according to a second embodiment of the present disclosure shown in FIG. 18 further includes a second display unit 1712. The type of the second display unit 1712 is different from that of the first display unit. For example, the second display unit 1712 includes, but not limited to, a liquid crystal display (LCD) unit, an organic electro luminescence display unit, an organic light emitting diode (OLED) display unit, or an E Ink type display unit, etc.

One of the first display unit 1710 and the second display unit 1712 is arranged on the main body apparatus 1706, and the other one is arranged on the fixing apparatus 1702. As shown in FIG. 18, the first display unit 1710 is arranged on the main body apparatus 1706, and the second display unit 1712 is arranged on the fixing apparatus 1702. Of course, the second display unit 1712 may be arranged on the main body apparatus 1706, and the first display unit 1710 is arranged on the fixing apparatus 1702. Similarly to the first display unit 1710, the display direction of the second display unit 1712 is the outward direction of the annular space or the approximate annular space. Generally, the second display unit 1712 is used to display content which does not need to be magnified, such as time indication, etc.

Also, it is not limited to the case shown in FIG. 18, the first display unit 1710 and the second display unit 1712 may be arranged on the main body apparatus 1706 or the fixing apparatus 1702 at the same time. For example, the first display unit 1710 and the second display unit 1712 are arranged on the main body apparatus 1706 side by side. Alternatively, the first display unit 1710 and the second display unit 1712 are arranged on two opposite locations across the radial direction of the fixing apparatus 1702.

Figure 19:
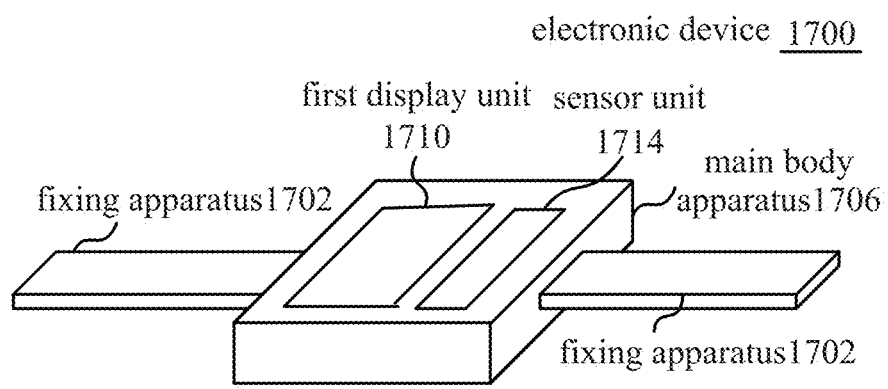
FIG. 19 illustrates an electronic device to which the display device according to an embodiment of the present disclosure is applied.

FIG. 19 is a structural diagram showing an electronic device according to a third embodiment of the present disclosure. Compared to the electronic device 1700 according to the first embodiment of the present disclosure described above with reference to FIGS. 17A-17E, the electronic device 1700 according to a third embodiment of the present disclosure shown in FIG. 19 further includes a sensor unit 1714. As shown in FIG. 19, the sensor unit 1714 is arranged on the main body apparatus 1706. However, the sensor unit 1714 may also be arranged on the fixing apparatus 1702.

The sensor unit 1714 is used to generate a first control signal when sensing that the first predetermined condition is met. The processing unit 1710 controls the on/off of the first display unit 1710 according to the first control signal. In an embodiment of the present disclosure, the sensor unit 1714 is an acceleration sensor, the acceleration component value in the gravity direction of the first control signal is larger than or equal to a predetermined value (that is, the user pulls down the electronic device 1700 from the use state in which the first display unit 1710 is watched), and the control apparatus controls to turn down the first display unit 1710 according to the first control signal. It will be easily understood by those skilled in the art that the sensor unit 1714 according to the embodiment of the present disclosure is not limited to the acceleration sensor, but may include other sensor unit which can generate the control signal.

Figure 20A:
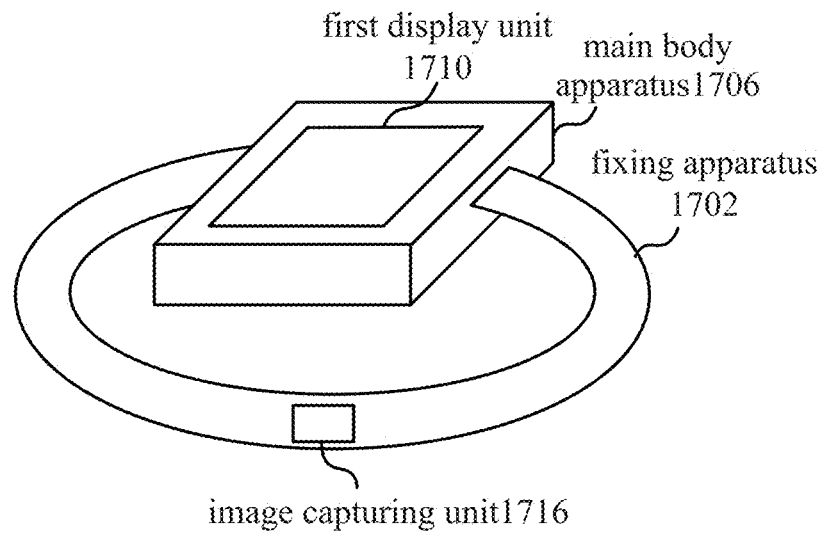
FIGS. 20A and 20B illustrate an electronic device to which the display device according to an embodiment of the present disclosure is applied.
Figure 20B:
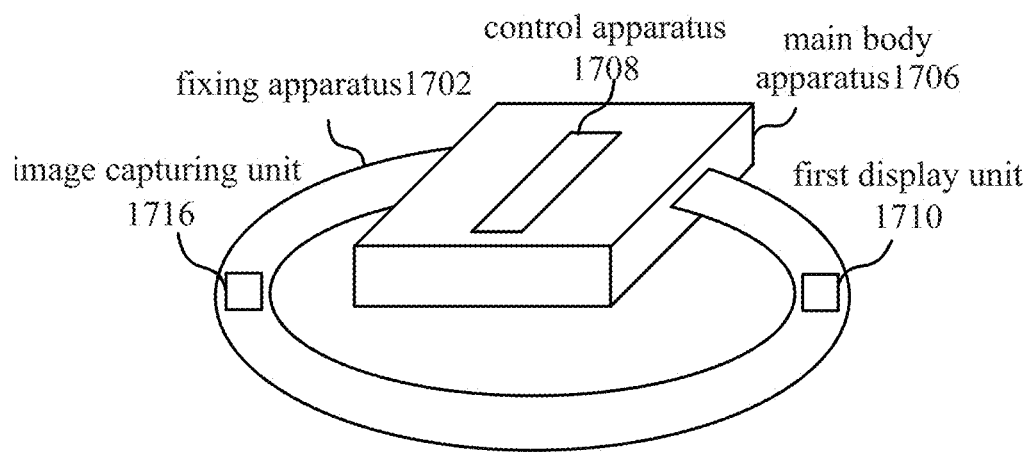

FIGS. 20A and 20B are structural diagrams showing an electronic device according to a fourth embodiment of the present disclosure. Compared to the electronic device 1700 according to the first embodiment of the present disclosure described above with reference to FIGS. 17A-17E, the electronic device 1700 according to the fourth embodiment of the present disclosure shown in FIGS. 20A and 20B further includes an image capturing unit 1716. The image capturing unit 1716 may be arranged on the main body apparatus 1706 or the fixing apparatus 1702. Particularly, FIG. 20A shows the case in which the first display unit 1710 is arranged on the main body apparatus 1706 and the image capturing unit 1716 is arranged on the fixing apparatus 1702. FIG. 20B shows the case in which both the first display unit 1710 and the image capturing unit 1716 are arranged on the fixing apparatus 1702. Here, the control apparatus in the first display unit 1710 is arranged on the main body apparatus 1706. No matter the case in FIG. 20A or FIG. 20B, the image capturing direction of the image capturing unit 1716 is opposite to an image output direction of the first display unit 1710 in the radial direction of the annular space or the approximate annular space. Thereby, when the real view image captured by the image capturing unit 1716 is displayed on the first display unit 1710, since the capturing direction of the image capturing unit 1716 is consistent with the viewing direction of the user's eye, the user may view the image as if perspective through the electronic device 1700 by the first display unit 1710.

In an embodiment of the present disclosure, the image capturing unit 1716 is used to capture an interaction action of the user to generate a first image capturing signal, the control apparatus in the first display unit 1710 converts the first image capturing signal into a second control signal to control the first display unit 1710 to display the second image.

In another embodiment of the present disclosure, the image capturing unit 1716 is used to capture a first sub image in the image capturing direction, and the control apparatus generates a second sub image which may be an identification image about the first sub image acquired by analyzing the first sub image, and may also be an identification image acquired based on the sensor such as the GPS sensor. Also, the second sub image may also be an identification image acquired from a server through network based on feature information acquired from the first sub image. The first sub image is superimposed with the second sub image to generate the first image for display by the first display unit 1710.

Figure 21:
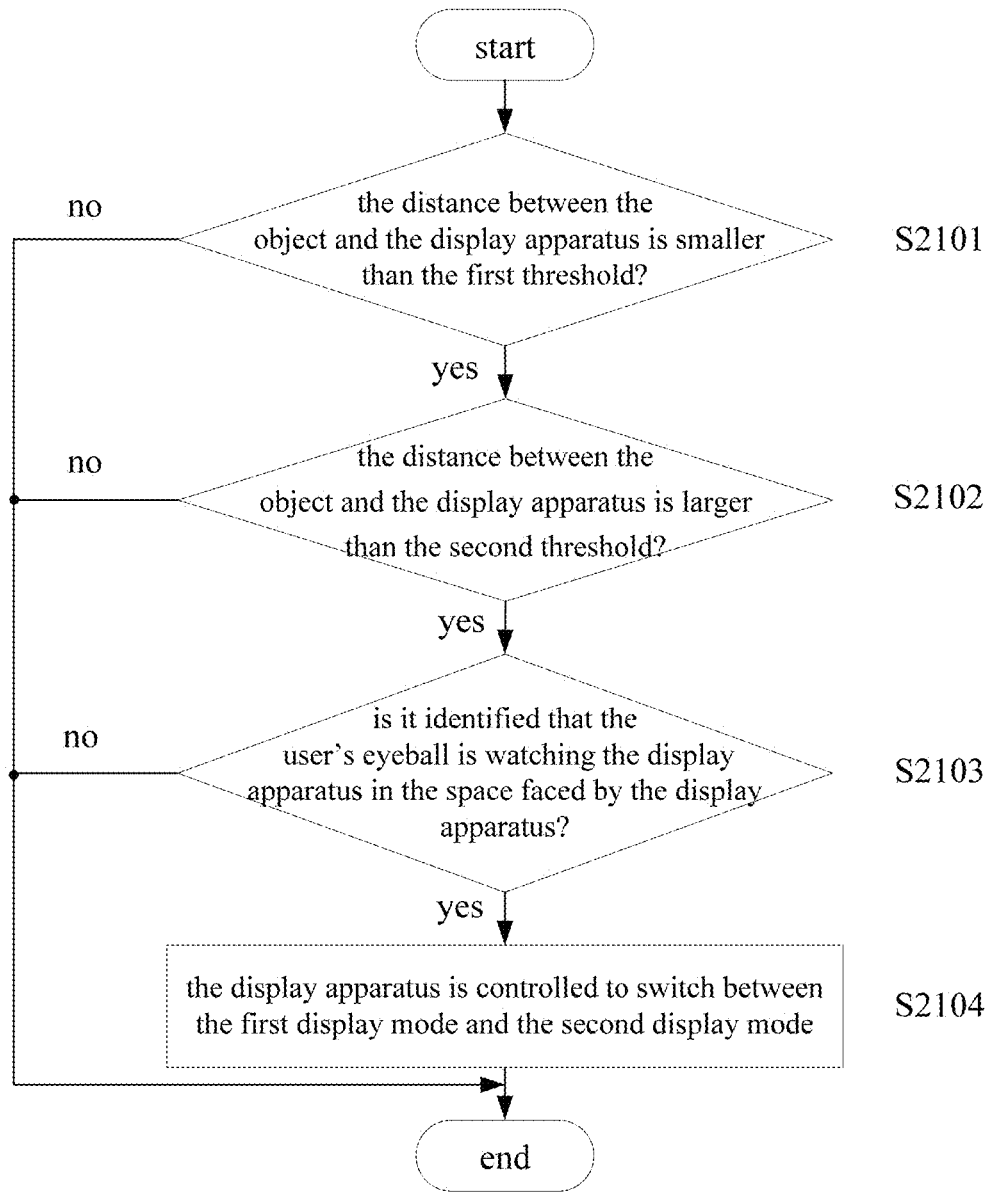
FIG. 21 is a flowchart showing a process of a display switch method according to an embodiment of the present disclosure.

The display device according to an embodiment of the present disclosure and the details when the display device according to an embodiment of the present disclosure is applied to the wearable electronic device have been described above in detail with reference to FIGS. 9-20B. Next, the display switch method applied to the display device will be described with reference to FIG. 21.

The display switch method includes the following steps.

At step S2104, the display unit is controlled to switch between a first display mode and a second display mode when a predetermined condition is met. The display image viewed by the user is a real image in the first display mode, and the display image viewed by the user is a virtual image in the second display mode. Generally, the real image viewed by the user is a real image of the same size, and the virtual image viewed by the user is a magnified virtual image. For example, in the first display mode, if the size of the image displayed by the display apparatus is 10 cm×15 cm, the size of the image felt by the user is 10 cm×15 cm, i.e., a real image of the same size. In the second display mode, if the size of the image displayed by the display apparatus is 10 cm×15 cm, the size of the image felt by the user is 20 cm×30 cm, i.e., a magnified virtual image.

Considering such a scene that the display device is in the first display mode, i.e., the normal display mode, when the distance between the user eye and the display device is a normal watching distance. In the first display mode, the user feels the image of the same size as the display region of the display device. When the distance between the user eye and the display device is smaller than the normal watching distance, the display device is in the second display mode, i.e., the near-to-eye display mode. In the second display mode, the user feels the image larger than the display region of the display device.

In this scene, as a possible implementation, the predetermined condition may be a predetermined condition about distance. At this time, the display switch method further includes detecting whether the distance between an object and the display apparatus is smaller than a first threshold or not at the step S2101; wherein the predetermined condition includes the distance between the object and the display unit being smaller than the first threshold.

However, the problem of this way is the error determination. For example, when the display device according to an embodiment of the present disclosure is applied to the smart watch, the case of the distance between the sleeve and the display apparatus being smaller than the first threshold may occur in winter. Alternatively, when the display device according to an embodiment of the present disclosure is applied to the smart phone, the case of the distance between the casing of the phone and the display screen being smaller than the first threshold may occur. The above listed cases should not be considered as the condition for triggering the switch of the display mode.

In order to solve the problem, as an optional implementation, the display switch method may further include detecting whether the distance between the object and the display apparatus is larger than a second threshold or not at step S2102. At this time, the predetermined condition further includes the distance between the object and the display apparatus being larger than the second threshold correspondingly.

The error determination due to the blocking of an unexpected object may be avoided effectively by further detecting whether the distance between the object and the display apparatus is larger than the second threshold or not.

Further, other types of error determinations are possible. For example, the detected object is not the user eye. This case should not be viewed as the condition triggering the switch of the display mode as well.

In order to solve the problem, as an optional implementation, the display switch method may further include an identifying step. As step S2103, it is identified whether the user's eyeball is watching the display apparatus in the viewable space faced by the display apparatus. At this time, the predetermined condition further includes that the user's eyeball is watching the display apparatus correspondingly. Particularly, the predetermined condition may be that the distance between the object and the display apparatus is smaller than the first threshold and the user's eyeball is watching the display apparatus, or may be that the distance between the object and the display apparatus is smaller than the first threshold and larger than the second threshold, and the user's eyeball is watching the display apparatus.

Further, the distance detection steps S2101-S2102 and the identifying step S2103 may be done serially. That is, the identifying step may be initiated after it is determined that the distance condition is met, or the distance detection step is initiated after it is determined that the eyeball condition is met. Alternatively, the distance detection steps and the identifying step may be done in parallel.

The identifying step may further include capturing image of an object; and analyzing the image to determine whether the user's eyeball is watching the display apparatus. For example, whether the user's eyeball is watching the display apparatus or not may be determined by performing the face recognition by photographing images. Alternatively, whether the user's eyeball is watching the display apparatus or not may be determined by the red eye effect in the photographed image. Of course, the present disclosure is not limited thereto, and any technology capable of detecting or determining the user's eyeball may be applied to the present disclosure properly.

Also, the image is displayed in a first region in the first display mode, and in a second region in the second display mode.

The display switch method further includes a step of determining the location of the second region based on the acquired parameter (not shown in FIG. 21), which may be set before the display switch in advance, or may be set after the display switch. As described above, the locations of the first region and the second region may be determined by the touch location, the eyeball location, or the optical attachment location or the like.

The display apparatus displays a first image in the first display mode, and displays a second image in the second display mode; and the display switch method further includes: controlling so that the content of the first image and the second image is correlated but different, and the information amount of the second image is larger than that of the first image (not shown in FIG. 21), which may be performed after the first display mode is switched to the second display mode, or before the switch. As described above, in the navigation application case, the first image may only include the navigation path, and the second image may include a full map including a navigation path, a name of passing by locations, or a transportation situation or the like.

The display device and the display switch method according to an embodiment of the present disclosure have been described above with reference to FIGS. 9-21. With the display device and the display switch method, two different watching experiences can be provided to the user, for example, a switching between a large size display and a small size display, and a switching between a brief display and a detailed display as well. Optionally, the switching can be performed on the same display device, so that the size and cost of the device can be effectively controlled.

It is to be noted that in the present description, the term of "comprising", "including" or the like does not intend to cover an inclusion exclusively, and a process, a method, an article or a device comprising a series of elements does not only include those elements, but also include other elements not listed explicitly, or include elements that art intrinsic to the process, the method, the article or the device. Without other limitations, the element defined by the term "comprising a" does not exclude to include other same element in the process, the method, the article or the device comprising the element.

Finally, it is to be noted that the above series of process does not include the process performed in a time order as described herein, but also include processes performed in parallel or separately, instead of in the time order.

With the description of the implementations above, those skilled in the art may understand that the technology in the embodiments of the present disclosure may be realized by software in combination with necessary general hardware platform, or entirely by hardware. Based on such understanding, the technical solution, or at least the part which contribute to the prior art, in the embodiment of the present disclosure, in essence, may be realized by software product, which may be stored in a storage medium such as a ROM/RAM, a magnetic diskette, an optical disk, etc., and include several instructions which may cause a computer device, such as a PC, a server or a network device etc., to perform the method according to the embodiments, or at least certain parts of the embodiments of the present disclosure.

The implementations of the present disclosure have been described above in detail. The principle and the implementations of the present disclosure are described by way of example. The description of the above embodiments is only to help the understanding of the method and the core of the present disclosure. To those skilled in the art, alternations may occur in terms of the implementation or the application range based on the idea of the present disclosure. In summary, the content of the specification does not be construed to limit the present disclosure thereto.

The invention claimed is:

1. An electronic device, comprising:
   a main body apparatus comprising a processing unit which generates a first image and performs display control;
   a fixing apparatus connected with the main body apparatus, which has at least a fixed state in which the fixing apparatus can be at least a part of an annular space or an approximate annular space meeting a first predetermined condition, the annular space or the approximate annular space being capable of surrounding an outer side of a cylinder meeting a second predetermined condition;
   a display unit arranged on the main body apparatus or the fixing apparatus, which outputs the first image; and
   a sensor unit arranged on the main body apparatus or the fixing apparatus, which generates a first control signal when sensing that the first predetermined condition is met, the processing unit controlling the on/off of the display unit according to the first control signal;
   wherein the display unit comprises a first display component which displays the first image, and a first optical component which is capable of at least receiving light corresponding to the first image emitted from the first display component, and changing the light path of the light corresponding to the first image to form a magnified virtual image corresponding to the first image,
   the display unit is capable of displaying image with two display modes; and
   the processing unit controls the display unit to switch between a first display mode and a second display mode when a third predetermined condition is met;
   the display image viewed by the user is a real image in the first display mode, and the display image viewed by the user is a virtual image in the second display mode.

2. The electronic device according to claim 1, wherein at least a part of the first optical component is a component the transmittance of which meets a predetermined condition in the outward direction of the annular space or the approximate annular space.

3. The electronic device according to claim 2, wherein the transmittance of the electronic device meets a predetermined condition in the outward direction of the annular space or the approximate annular space corresponding to the at least a part of the first optical component.

4. The electronic device according to claim 1, wherein the sensor unit is an accelerator sensor, the accelerator component value in the gravity direction of the first control signal is larger than or equal to a predetermined value, and the processing unit controls the on/off of the display unit according to the first control signal.

5. The electronic device according to claim 1, further comprising an image capturing unit arranged on the main body apparatus or the fixing apparatus, an image capturing direction of the image capturing unit is opposite to an image output direction of the display unit in the radial direction of the annular space or the approximate annular space.

6. The electronic device according to claim 5, wherein the image capturing unit captures an interaction action of the user to generate a first image capturing signal, the processing unit converts the first image capturing signal into a second control signal to control the display of a second image.

7. The electronic device according to claim 1, wherein the display region of the display unit in the first display mode is a first region and the display region of the display unit in the second display mode is a second region at least partly overlapped with the first region.

8. The electronic device according to claim 1, further comprising
   a distance detection unit arranged near the display unit, the detection direction of which is towards a viewable space of the display unit, which detects a distance parameter between an object and the display unit;
   wherein the third predetermined condition is that the distance between the object and the display unit is smaller than a first threshold.

9. The electronic device according to claim 8, wherein the third predetermined condition further comprises the distance between the object and the display unit being larger than a second threshold.

10. The electronic device according to claim 1, wherein
    the first optical component covers the first display unit and meets a predetermined transmittance, so that the user can view the first image displayed on the first display component via the first optical component; and
    the first optical component has two optical modes, the first optical component is in a first optical mode in the first display mode, and is in a second optical mode in the second display mode.

11. The electronic device according to claim 10, wherein the first optical component is constructed of a shape changeable cavity and filled-in liquid; and in the first display mode, the first optical component is in the first optical mode, the shape changeable cavity does not change its shape and maintains a first shape so that the user views a real image of the same size with the image displayed on the first display component via the shape changeable cavity; in the second display mode, the first optical component is in the second optical mode, the shape changeable cavity changes its shape to a second shape, and the user views a magnified virtual image of the display image on the first display component via the shape changeable cavity.

12. The electronic device according to claim 1, wherein the first optical component is a separable attachment and the user views the magnified virtual image via the separable attachment in the second display mode.

13. The electronic device according to claim 1, the display unit displays a first image in the first display mode, and displays a second image in the second display mode; and the processing unit generates the second image based on the first image, so that content of the first image and the second image is correlated but different, and information amount of the second image is larger than that of the first image.

14. A display switch method applied to the electronic device of claim 1 having a display unit capable of displaying an image with two display modes, the display switch method comprising controlling the display unit to switch between a first display mode and a second display mode when a predetermined condition is met; wherein the display image viewed by a user is a real image in the first display mode, and the display image viewed by the user is a virtual image in the second display mode.

15. The display switch method according to claim 14, further comprising detecting a distance parameter between an object and the display unit wherein the predetermined condition is that the distance between the object and the display unit is smaller than a first threshold.

16. The display switch method according to claim 14, wherein the image is displayed in a first region in the first display mode, and in a second region in the second display mode; and the display switch method further comprises determining a location of the second region based on an acquired parameter.

17. The display switch method according to claim 14, wherein the display unit displays a first image in the first display mode, and displays a second image in the second display mode; and the display switch method further comprises generating the second image based on the first image, so that content of the first image and the second image is correlated but different, and information amount of the second image is larger than that of the first image.

18. A display method applied to an electronic device comprising a main body apparatus comprising:
 a processing unit which generates a first image and performs display control;
 a fixing apparatus connected with the main body apparatus, which has at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and
 a display unit arranged on the main body apparatus or the fixing apparatus, which outputs the first image, wherein the display unit comprises a first display component which displays the first image, and a first optical component which receives light corresponding to the first image emitted from the first display component, and changes the light path of the light corresponding to the first image to form a magnified virtual image corresponding to the first image, and the display unit is capable of displaying image with two display modes, the display method comprising:
generating or acquiring an image signal for display by the processing unit; and
displaying based on the image signal by display unit,
wherein the processing unit controls the display unit to switch between a first display mode and a second display mode when a third predetermined condition is met;
the display image viewed by the user is a real image in the first display mode, and the display image viewed by the user is a virtual image in the second display mode.

\* \* \* \* \*